US012774430B2

(12) United States Patent
Caracci et al.

(10) Patent No.: US 12,774,430 B2
(45) Date of Patent: Oct. 27, 2026

(54) PROCESS FOR TREATING A FABRIC ARTICLE

(71) Applicant: The Procter & Gamble Company, Cincinnati, OH (US)

(72) Inventors: David Joseph Caracci, Cincinnati, OH (US); Justine Brieanna Woodburn, Cincinnati, OH (US); Michael Joseph Dempsey Doyle, Cincinnati, OH (US); Gary Scott Childers, Cincinnati, OH (US); Brandon Douglas Gaddis, Cincinnati, OH (US); Stephanie Lynn Lause, Alexandria, KY (US)

(73) Assignee: The Procter & Gamble Company, Cincinnati, OH (US)

(*) Notice: Subject to any disclaimer, the term of this patent is extended or adjusted under 35 U.S.C. 154(b) by 219 days.

(21) Appl. No.: 18/672,559

(22) Filed: May 23, 2024

(65) Prior Publication Data

US 2025/0361464 A1 Nov. 27, 2025

(51) Int. Cl.

| | |
|---|---|
| ***C11D 3/37*** | (2006.01) |
| ***C11D 3/00*** | (2006.01) |
| ***C11D 3/20*** | (2006.01) |
| ***C11D 3/50*** | (2006.01) |
| ***C11D 17/00*** | (2006.01) |
| ***D06F 35/00*** | (2006.01) |

(52) U.S. Cl.

CPC .......... *C11D 3/3742* (2013.01); *C11D 3/0015* (2013.01); *C11D 3/2075* (2013.01); *C11D 3/50* (2013.01); *C11D 17/0017* (2013.01); *D06F 35/006* (2013.01)

(58) Field of Classification Search

CPC ....... C11D 3/3742; C11D 3/0015; C11D 3/50; C11D 17/00

See application file for complete search history.

(56) References Cited

U.S. PATENT DOCUMENTS

| | | | | |
|---|---|---|---|---|
| 12,600,928 | B2 * | 4/2026 | Delaney | C11D 1/83 |
| 2005/0000031 | A1 | 1/2005 | Price | |
| 2009/0095027 | A1 | 4/2009 | Deppermann | |
| 2013/0232700 | A1 | 9/2013 | Smith | |
| 2016/0060574 | A1 * | 3/2016 | Panandiker | C11D 1/22 510/327 |

(Continued)

FOREIGN PATENT DOCUMENTS

| | | | |
|---|---|---|---|
| CN | 121896797 | A * | 4/2026 |
| EP | 0090291 | A2 | 10/1983 |

(Continued)

OTHER PUBLICATIONS

PCT Search Report and Written Opinion for PCT/US2025/029469 dated Jul. 8, 2025, 12 pages.

*Primary Examiner* — Mark Eashoo
*Assistant Examiner* — M. Reza Asdjodi
(74) *Attorney, Agent, or Firm* — Carolyn S. Powell; Gary J. Foose

(57) ABSTRACT

A process for treating a fabric article including three treatment sub-cycles. During each sub-cycle, a laundry treatment composition is applied. The laundry treatment compositions include a detergent composition, an acid treatment composition, and optionally a tertiary treatment composition that can provide one or more of a softening benefit, a scent benefit, and a water or stain repellency benefit.

16 Claims, 4 Drawing Sheets

(56) References Cited

U.S. PATENT DOCUMENTS

| | | | | |
|---|---|---|---|---|
| 2017/0114310 | A1* | 4/2017 | Schmiedel | C11D 17/0021 |
| 2017/0121650 | A1* | 5/2017 | Lundberg | C11D 3/0036 |
| 2019/0352586 | A1* | 11/2019 | Schmiedel | C11D 17/0021 |
| 2020/0140791 | A1* | 5/2020 | Delaney | C11D 1/83 |
| 2020/0190442 | A1* | 6/2020 | Brooker | C11D 1/83 |
| 2023/0399592 | A1* | 12/2023 | Delaney | C11D 1/83 |
| 2025/0188662 | A1* | 6/2025 | Woodburn | D06F 34/28 |
| 2025/0361464 | A1* | 11/2025 | Caracci | C11D 1/83 |

FOREIGN PATENT DOCUMENTS

| | | | | |
|---|---|---|---|---|
| EP | 3650523 | A1 * | 5/2020 | C11D 3/2079 |
| WO | 2020123113 | A1 | 6/2020 | |

* cited by examiner

PROCESS FOR TREATING A FABRIC ARTICLE

FIELD OF THE INVENTION

Laundry washing machines typically configured to have an overall operation cycle of a wash sub-cycle followed by a rinse sub-cycle. Within each of these sub-cycles, there may be steps of partially filling the drum with water, adding to the water a treatment composition intended for use as part of the sub-cycle, and draining the liquor used during the sub-cycle from the drum. The user is enabled to provide one or more treatment compositions for the wash sub-cycle and a treatment composition for the rinse sub-cycle. Commonly, a detergent composition is applied in the wash sub-cycle and a fabric softening composition is applied in the rinse sub-cycle.

BACKGROUND OF THE INVENTION

Domestic and commercial laundry often has a variety of deleterious substances engaged with the fibers of the fabric articles making up a load of laundry. For example, soils, oils, stains from organic substance, stains from inorganic substances, and other substances may be engaged with the fibers of the fabric articles may be deposited on or within the fibers of the fabric articles. The technical problem of treating laundry is highly complex. Applying thermal and or mechanical energy to treating laundry can only provide a limited degree of success with respect to treating fabric articles. The use of chemical energy can provide for improvement to the process of treating fabric articles. The chemistry of treating laundry is complicated by the variety of substances engaged with the fibers of the fabric articles. Certain chemical treatments may perform better or worse depending on the conditions that the treatment is applied and depending on the order in which the chemical treatments are applied. Moreover, certain chemical treatments may not be chemically compatible with one another such that they can be applied in a single sub-cycle or satisfactorily formulated in a product that can be applied in a single sub-cycle.

With these limitations in mind, there is a continuing unaddressed need for improved processes for treating fabric articles that enable optimal application of energy towards treating fabric articles that are common in laundry.

SUMMARY OF THE INVENTION

A process for treating a fabric article comprising steps of: providing a fabric article within a rotatable drum within a washing machine; conducting a first laundry treatment sub-cycle comprising steps of: providing a detergent composition to said washing machine, wherein said detergent composition comprises: from about 10% to about 80% by weight of the detergent composition anionic surfactant; and from about 10% to about 80% by weight of the detergent composition nonionic surfactant; providing within said drum a wash liquor formed by combining said detergent composition and a first water; and contacting said wash liquor to said fabric article; conducting a second laundry treatment sub-cycle comprising steps of: providing an acidic treatment composition to said washing machine, wherein said acidic treatment composition comprises: from about 10% to 99% by weight of said acidic treatment composition organic acid; providing within said drum a treatment liquor formed by combining said acidic treatment composition and a second water; and contacting said treatment liquor to said fabric article; conducting a third laundry treatment sub-cycle comprising the steps of: providing a tertiary treatment composition to said washing machine, wherein said tertiary treatment composition is selected from the group of: a fabric softening composition comprising from about 2% to about 20% by weight of said fabric softening composition a fabric softening active; a scent additive composition comprising from about 1% to about 100% by weight of said scent additive composition a perfume; a fabric softening composition comprising a perfume and from about 2% to about 20% by weight of the fabric softening composition a fabric softening active; and an emulsion comprising an aminoalkyl containing polyorganosiloxane or silicone resin; providing within said drum a tertiary liquor formed by combining said tertiary treatment composition and a third water; and contacting said tertiary liquor to said fabric article and thereafter draining said tertiary liquor or a water dilution thereof from said drum and rinsing said fabric article.

A process for treating a fabric article comprising steps of: providing a fabric article within a rotatable drum within a washing machine; conducting a first laundry treatment sub-cycle comprising steps of: providing an acidic treatment composition to said washing machine, wherein said acidic treatment composition comprises: from about 10% to 99% by weight of said acidic treatment composition organic acid; providing within said drum a treatment liquor formed by combining said acidic treatment composition and a first water; and contacting said treatment liquor to said fabric article; conducting a second laundry treatment sub-cycle comprising steps of: providing a detergent composition to said washing machine, wherein said detergent composition comprises: from about 10% to about 80% by weight of the detergent composition anionic surfactant; and from about 10% to about 80% by weight of the detergent composition nonionic surfactant; providing within said drum a wash liquor formed by combining said detergent composition and a second water; and contacting said wash liquor to said fabric article; conducting a third laundry treatment sub-cycle comprising the steps of: providing a tertiary treatment composition to said washing machine, wherein said tertiary treatment composition is selected from the group of: a fabric softening composition comprising from about 2% to about 20% by weight of said fabric softening composition a fabric softening active; a scent additive composition comprising from about 1% to about 100% by weight of said scent additive composition a perfume; a fabric softening composition comprising a perfume and from about 2% to about 20% by weight of the fabric softening composition a fabric softening active; and an emulsion comprising an aminoalkyl containing polyorganosiloxane or silicone resin; providing within said drum a tertiary liquor formed by combining said tertiary treatment composition and a third water; and contacting said tertiary liquor to said fabric article and thereafter draining said tertiary liquor or a water dilution thereof from said drum and rinsing said fabric article.

A process for treating a fabric article comprising steps of: providing a fabric article within a rotatable drum within a washing machine; conducting a first laundry treatment sub-cycle comprising steps of: providing an acidic treatment composition to said washing machine, wherein said acidic treatment composition comprises: from about 10% to 99% by weight of said acidic treatment composition organic acid; providing within said drum a treatment liquor formed by combining said acidic treatment composition and a first water; and contacting said treatment liquor to said fabric article; conducting a second laundry treatment sub-cycle comprising steps of: providing a detergent composition to said washing machine, wherein said detergent composition comprises: from about 10% to about 80% by weight of the detergent composition anionic surfactant; and from about 10% to about 80% by weight of the detergent composition nonionic surfactant; providing within said drum a wash liquor formed by combining said detergent composition and a second water; and contacting said wash liquor to said fabric article; conducting a third laundry treatment sub-cycle that comprising the steps of: providing a tertiary treatment composition to said washing machine, wherein said tertiary treatment composition comprises: from about 10% to 99% by weight of said tertiary treatment composition organic acid; providing within said drum a treatment liquor formed by combining said tertiary treatment composition and a third water; and contacting said treatment liquor to said fabric article.

DETAILED DESCRIPTION OF THE INVENTION

Figure 1:
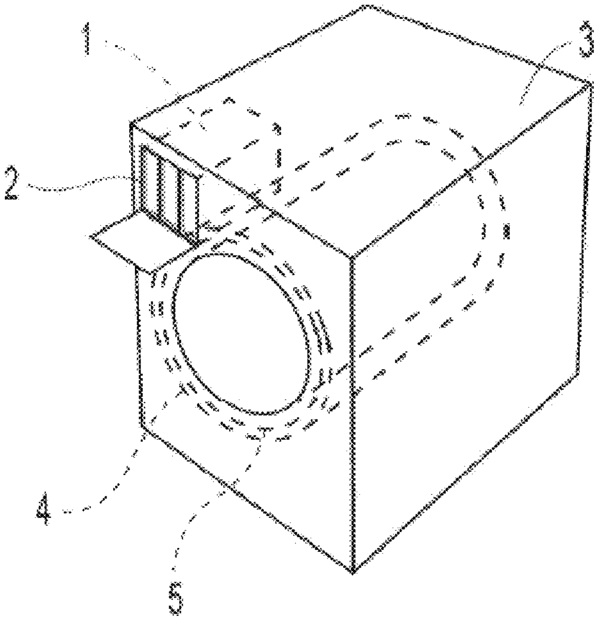
FIG. 1 is a schematic of a washing machine.

Unless otherwise noted, all component or composition levels are in reference to the active portion of that component or composition, and are exclusive of impurities, for example, residual solvents or by-products, which may be present in commercially available sources of such components or compositions.

Detergent Composition

The detergent composition can provided in a quantity of from about 10 mL to about 200 mL, optionally from 20 mL to 100 mL, optionally from 25 mL to 75 mL, for liquid detergent compositions, or from about 10 g to about 300 g, optionally from 20 g to 200 g, optionally from 30 g to 150 g, for powder or granular detergent compositions. As such, the detergent composition can be present in the wash liquor at a level of from 100 ppm to 2500 ppm, optionally from 400 ppm to 2000 ppm, optionally from 500 ppm to 1500 ppm.

The detergent composition can be in any suitable form, such as liquid, paste, granular, solid, powder, or in conjunction with a carrier such as a substrate, detergent sheet or fibrous article.

The detergent composition can be a liquid laundry detergent composition optionally having a density in the range from 0.9 to 1.3 grams per cubic centimeters, optionally from 1.00 to 1.10 grams per cubic centimeters, excluding any solid additives but including any bubbles, if present.

The detergent composition can be an aqueous detergent composition. For such aqueous detergent compositions, the water content can be from 5% to 95%, optionally from 25% to 90%, optionally from 50% to 85% by weight of the liquid detergent composition.

The pH range of the detergent composition can be from 6.0 to 8.9, optionally from pH 7 to 8.8.

The detergent composition can be encapsulated in a water-soluble film, to form a unit dose article. A water-soluble unit dose article comprises at least one water-soluble film formed to create at least one internal compartment, wherein the at least one internal compartment comprises the liquid detergent composition. As such, the water-soluble film dissolves or disperses into a wash liquor comprising water. The water-soluble film is sealed such that the detergent composition does not leak out of the compartment during storage. Upon addition of the water-soluble unit dose article to water, the water-soluble film dissolves and releases the contents of the internal compartment into the wash liquor.

Liquid detergent compositions, contained within a unit dose article are typically low in water, comprising less than 20%, optionally from 5% to 20%, optionally from 10% to 15% by weight of water. Such liquid detergent compositions are also typically highly concentrated, comprising ingredients, such as surfactants, at a level of 25% to 100%, optionally 30% to 70% higher than the active levels present in liquid detergent compositions which are not encapsulated into unit dose articles. The unit dose articles may have a weight of from 10 g to 100 g, or from, 10 g to 70 g, or from 15 g to 50 g, or from 15 g to 35 g. The unit dose articles can comprise a water soluble film that contains the detergent composition.

The detergent composition can comprise a surfactant system at a level of from 2.5% to 70%, preferably from 7.0% to 50%, more preferably from 10% to 35% by weight of the composition. Suitable surfactants as used herein means surfactants or mixtures of surfactants that provide cleaning, stain removing, or laundering benefit to soiled material. Suitable detersive surfactants can be: anionic surfactant, nonionic surfactant, zwitterionic surfactant, and combinations thereof. The surfactant system can comprise a branched nonionic surfactant. The surfactant system can further comprise a surfactant selected from the group consisting of: anionic surfactant, amphoteric surfactant, and mixtures thereof. As such, the surfactant system can comprise a combination of anionic and nonionic surfactant, optionally a combination of anionic surfactant, nonionic surfactant, and amphoteric surfactant. Optionally, surfactants comprising saturated alkyl chains are used.

The surfactant system can comprise anionic surfactant. The surfactant system can comprise anionic surfactant at a level of from 1.4% to 52%, optionally from 4.4% to 20%, optionally from 5.9% to 11.5% of the liquid detergent composition.

The anionic surfactant can comprise alkyl sulfate anionic surfactant having an average degree of alkoxylation of 1.0 or less. The alkyl sulfate anionic surfactant can have an average degree of alkoxylation of 0.5 or less, optionally 0.1 or less, optionally be free of alkoxylation. If alkoxylation is present, ethoxylation can be desirable.

Anionic sulfate salts suitable for use in the detergent composition include the primary and secondary alkyl sulfates, having a linear or branched alkyl or alkenyl moiety having from 9 to 22 carbon atoms or more preferably 12 to 18 carbon atoms. Also useful are beta-branched alkyl sulfate surfactants or mixtures of commercially available materials, having a weight average (of the surfactant or the mixture) branching degree of at least 50%. Mid-chain branched alkyl sulfates or sulfonates are also suitable anionic surfactants for use in the compositions of the invention. Possible of interest are the C5-C22, preferably C10-C20 mid-chain branched alkyl primary sulfates. When mixtures are used, a suitable average total number of carbon atoms for the alkyl moieties can be within the range of from greater than 14.5 to 17.5. Optionally mono-methyl-branched primary alkyl sulfates are selected from the group of the 3-methyl to 13-methyl pentadecanol sulfates, the corresponding hexadecanol sulfates, and mixtures thereof. Dimethyl derivatives or other biodegradable alkyl sulfates having light branching can similarly be used. Suitable alkyl sulfates also include C10-C18 alkyl sulfates, optionally C12-C15 alkyl sulfates.

Optionally low ethoxylation alkyl sulfate surfactants do not comprise any further alkoxylation. Optionally low ethoxylation alkyl sulfate surfactants comprise branched alkyl sulfate surfactant. The branched alkyl sulfate surfactant can comprise at least 20%, optionally from 60% to 100%, optionally from 80% to 90% by weight of the alkyl chains of the branched alkyl sulfate surfactant of 2-branched alkyl chains. Such branched alkyl sulfates with 2-branched alkyl chains can also be described as 2-alkyl alkanol sulfates, or 2-alkyl alkyl sulfates. The branched alkyl sulfates can be neutralized by sodium, potassium, magnesium, lithium, calcium, ammonium, or any suitable amines, such as, but not limited to monoethanolamine, triethanolamine and monoisopropanolamine, or by mixtures of any of the neutralizing metals or amines. Suitable branched alkyl sulfate surfactants can comprise alkyl chains comprising from 10 to 18 carbon atoms (C10 to C18) or from 12 to 15 carbon atoms (C12 to C15), with 13 to 15 carbon atoms (C13 to C15) possibly being of interest. The branched alkyl sulfate surfactant can be produced using processes which comprise a hydroformylation reaction in order to provide the desired levels of 2-branching. Branched alkyl sulfate surfactants can comprise 2-branching, wherein the 2-branching comprises from 20% to 80%, optionally from 30% to 65%, optionally from 40% to 50% by weight of the 2-branching of methyl branching, ethyl branching, and mixtures thereof.

Suitable low ethoxylated branched alkyl sulfate surfactants can be derived from alkyl alcohols such as LIAL 145, ISALCHEM 145, both supplied by Sasol, optionally blending with other alkyl alcohols in order to achieve the desired branching distributions.

Optionally, using alkyl sulfate anionic surfactants which comprise only low levels of ethoxylation, or even being free of ethoxylation, can be desirable. As such, the alkyl sulfate surfactant can have a degree of ethoxylation of less than 1.0, or less than 0.5, or even be free of ethoxylation.

The surfactant system can further comprise anionic surfactant, such as sulfonate surfactant. The sulfonate anionic surfactant can be selected from the group of: alkylbenzene sulfonates, alkyl ester sulfonates, alkane sulfonates, alkyl sulfonated polycarboxylic acids, and mixtures thereof, optionally alkylbenzene sulfonates, alkyl ester sulfonates, alkane sulfonates, and mixtures thereof, optionally alkylbenzene sulfonates. A combination of linear alkyl benzene sulfonate and alkyl sulfate surfactant may be practical, and also improves stain removal.

The anionic surfactant can comprise sulfonate anionic surfactant, alkyl sulfate anionic surfactant, and mixtures thereof, optionally a mixture of sulfonate anionic surfactant and alkyl sulfate anionic surfactant. For improved stability and grease cleaning, the liquid detergent composition can comprise a combination of sulfonate surfactant and alkyl sulfate surfactant, preferably such that the ratio of linear alkyl benzene sulfonate surfactant to alkyl alkoxylated sulfate surfactant is in a weight ratio of from 15:1 to 0.5:1, optionally from 10:1 to 0.7:1, optionally from 4:1 to 1:1.

Anionic sulfonate or sulfonic acid surfactants suitable for use in the detergent composition include the acid and salt forms of alkylbenzene sulfonates, alkyl ester sulfonates, alkane sulfonates, alkyl sulfonated polycarboxylic acids, and mixtures thereof. Suitable anionic sulfonate or sulfonic acid surfactants include: C5-C20 alkylbenzene sulfonates, optionally C10-C16 alkylbenzene sulfonates, optionally C11-C13 alkylbenzene sulfonates, C5-C20 alkyl ester sulfonates, C6-C22 primary or secondary alkane sulfonates, C5-C20 sulfonated polycarboxylic acids, and any mixtures thereof, optionally C11-C13 alkylbenzene sulfonates. The aforementioned surfactants can vary widely in their 2-phenyl isomer content.

Other suitable anionic surfactants include fatty acids and their salts, which are typically added as builders. However, by nature, every anionic surfactant known in the art of detergent compositions may be used, such as disclosed in "Surfactant Science Series", Vol. 7, edited by W. M. Linfield, Marcel Dekker.

Other suitable anionic surfactants for use herein include fatty methyl ester sulfonates and/or alkyl polyalkoxylated carboxylates, for example, alkyl ethoxylated carboxylates (AEC).

The anionic surfactants are typically present in the form of their salts with alkanolamines or alkali metals such as sodium and potassium.

The surfactant system can comprise nonionic surfactant. The nonionic surfactant can be selected from alkoxylated alkyl alcohol nonionic surfactant, alkyl polyglucoside, and mixtures thereof. Optionally, the nonionic surfactant comprises alkyl polyglucoside nonionic surfactant.

The surfactant system can comprise alkyl polyglucoside nonionic surfactant. The surfactant system can comprise the alkyl polyglucoside ("APG") at a level of from 0.5% to 10%, optionally from 1.0% to 8.0%, optionally from 2.0% to 6.0% by weight of the composition.

For improved whiteness, the alkyl polyglucoside surfactant can have a number average alkyl carbon chain length from 8 to 16, optionally from 10 to 14, optionally from 12 to 14, with an average degree of polymerization of from 0.1 to 3.0, preferably from 1.0 to 2.0, optionally from 1.2 to 1.6.

C8-C18 alkyl polyglucosides are commercially available from several suppliers (e.g., SIMUSOL surfactants from Seppic Corporation; and GLUCOPON 600 CSUP, GLUCOPON 650 EC, GLUCOPON 600 CSUP/MB, and GLUCOPON 650 EC/MB, from BASF Corporation). The surfactant system can comprise further nonionic surfactant, optionally at low levels such as less than 5%, optionally from 0.1% to 3.0%, optionally from 0.5% to 2.0% by weight of the composition. Optionally, the composition can comprise less than 0.5% of further nonionic surfactant, and can be even be free of further nonionic surfactant.

Further suitable nonionic surfactants include, but are not limited to C12-C18 alkyl ethoxylates ("AE") including the so-called narrow peaked alkyl ethoxylates and C6-C12 alkyl phenol alkoxylates (ethoxylates and mixed ethoxy/propoxy), block alkylene oxide condensate of C6-C12 alkyl phenols, alkylene oxide condensates of C8-C22 alkanols and ethylene oxide/propylene oxide block polymers (PLURONIC-BASF Corp.), as well as semi polar nonionics (e.g., amine oxides and phosphine oxides) can be used in the present compositions. An extensive disclosure of these types of surfactants is found in U.S. Pat. No. 3,929,678, Laughlin et al., issued Dec. 30, 1975.

Alkylpolysaccharides such as disclosed in U.S. Pat. No. 4,565,647 may also useful nonionic surfactants in the compositions of the invention.

The surfactant system can comprise amphoteric and/or zwitterionic surfactant at a level of from 0.1% to 2.0%, preferably from 0.1% to 1.0%, more preferably from 0.1% to 0.5% by weight of the liquid laundry detergent composition.

Suitable amphoteric surfactants include amine oxide surfactants. Amine oxide surfactants are amine oxides having the following formula: R1R2R3NO wherein R1 is an hydrocarbon chain comprising from 1 to 30 carbon atoms, optionally from 6 to 20, optionally from 8 to 16 and wherein R2 and R3 are independently saturated or unsaturated, substituted or unsubstituted, linear or branched hydrocarbon chains comprising from 1 to 4 carbon atoms, optionally from 1 to 3 carbon atoms, and optionally are methyl groups. R1 may be a saturated or unsaturated, substituted or unsubstituted linear or branched hydrocarbon chain.

Suitable amine oxides for use herein can be C12-C14 dimethyl amine oxide (lauryl dimethylamine oxide), commercially available from Albright & Wilson, C12-C14 amine oxides commercially available under the trade name GENAMINOX LA from Clariant or AROMOX DMC from AKZO Nobel.

Suitable amphoteric or zwitterionic detersive surfactants include those which are known for use in hair care or other personal care cleansing. Non-limiting examples of suitable zwitterionic or amphoteric surfactants are described in U.S. Pat. Nos. 5,104,646, 5,106,609. Suitable amphoteric detersive surfactants include those surfactants broadly described as derivatives of aliphatic secondary and tertiary amines in which the aliphatic radical can be straight or branched chain and wherein one of the aliphatic substituents contains from 8 to 18 carbon atoms and one contains an anionic group such as carboxy, sulfonate, sulfate, phosphate, or phosphonate. Suitable amphoteric detersive surfactants for use in the present invention include, but are not limited to: cocoamphoacetate, cocoamphodiacetate, lauroamphoacetate, lauroamphodiacetate, and mixtures thereof.

The detergent composition may additionally comprise one or more of the following optional ingredients: external structurant or thickener, enzymes, enzyme stabilizers, cleaning polymers, bleaching systems, optical brighteners, hueing dyes, particulate material, perfume and other odor control agents, hydrotropes, suds suppressors, fabric care benefit agents, pH adjusting agents, dye transfer inhibiting agents, dye fixative polymers, preservatives, non-fabric substantive dyes and mixtures thereof. Optionally, the laundry detergent composition does not comprise a bleach. Optionally, a bleach can be added to the wash liquor after a discrete period of time of the first laundry treatment sub-cycle. The bleach can be added during a second half of the duration of the first laundry treatment sub-cycle.

External structurant or thickener: Optional external structurants and thickeners are those that do not rely on charge-charge interactions for providing a structuring benefit. As such, possible practical external structurants may include uncharged external structurants, such as those selected from the group consisting of: non-polymeric crystalline, hydroxyl functional structurants, such as hydrogenated castor oil; microfibrillated cellulose; uncharged hydroxyethyl cellulose; uncharged hydrophobically modified hydroxyethyl cellulose; hydrophobically modified ethoxylated urethanes; hydrophobically modified non-ionic polyols; and mixtures thereof.

Suitable polymeric structurants may include naturally derived and/or synthetic polymeric structurants.

Examples of naturally derived polymeric structurants of use in detergent compositions include: microfibrillated cellulose, hydroxyethyl cellulose, hydrophobically modified hydroxyethyl cellulose, carboxymethyl cellulose, polysaccharide derivatives and mixtures thereof. Non-limiting examples of microfibrillated cellulose are described in WO2009/101545A. Suitable polysaccharide derivatives include: pectin, alginate, arabinogalactan (gum Arabic), carrageenan, gellan gum, xanthan gum, guar gum and mixtures thereof.

Examples of synthetic polymeric structurants or thickeners of use in the present invention may include: polycarboxylates, hydrophobically modified ethoxylated urethanes (HEUr), hydrophobically modified non-ionic polyols and mixtures thereof.

Optionally, the aqueous liquid detergent composition can have a viscosity of 50 to 5,000, optionally 75 to 1,000, optionally 100 to 500 mPa·s, when measured at a shear rate of 100 $s^{-1}$, at a temperature of 20° C. For improved phase stability, and also improved stability of suspended ingredients, the aqueous liquid detergent composition can have a viscosity of 50 to 250,000, optionally 5,000 to 125,000, optionally 10,000 to 35,000 mPa·s, when measured at a shear rate of 0.05 $s^{-1}$, at a temperature of 20° C.

Cleaning polymers: The detergent composition can comprises a cleaning polymer. Such cleaning polymers are believed to at least partially lift the stain from the textile fibers and enable the enzyme system to more effectively break up the complexes comprising mannan and other polysaccharide. Suitable cleaning polymers provide for broad-range soil cleaning of surfaces and fabrics and/or suspension of the soils. Non-limiting examples of suitable cleaning polymers include: amphiphilic alkoxylated grease cleaning polymers; clay soil cleaning polymers; soil release polymers; and soil suspending polymers.

For similar reasons, polyester based soil release polymers, such as SRA300, supplied by Clariant may be practical.

Other useful cleaning polymers are described in US20090124528A. The detergent composition may comprise amphiphilic alkoxylated grease cleaning polymers, which may have balanced hydrophilic and hydrophobic properties such that they remove grease particles from fabrics and surfaces. The amphiphilic alkoxylated grease cleaning polymers may comprise a core structure and a plurality of alkoxylate groups attached to that core structure. These may comprise alkoxylated polyalkyleneimines, for example. Such compounds may comprise, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF. The alkoxylated polyalkyleneimines may have an inner polyethylene oxide block and an outer polypropylene oxide block. The detergent compositions may comprise from 0.1% to 10%, optionally, from 0.1% to 8.0%, optionally from 0.1% to 2.0%, by weight of the detergent composition, of the cleaning polymer.

Dye transfer inhibiting polymers: The detergent composition can comprise one or more dye transfer inhibiting polymer.

When used, suitable dye transfer inhibiting can be selected from the group of polyvinylpyrrolidone (PVP), polyvinylimidazole (PVI), copolymers of vinylpyrrolidone and vinylimidazole (PVP/PVI), polyvinyl pyridine-N-oxide, poly-N-carboxymethyl-4-vinylpyridiumchloride, poly(2-hydroxypropyldimethylammonium chloride), and mixtures thereof, preferably polyvinylpyrrolidone (PVP), polyvinylimidazole (PVI), copolymers of vinylpyrrolidone and vinylimidazole (PVP/PVI), and mixtures thereof. If present, the dye transfer inhibitor can be present at a level of from 0.05% to 5%, or from 0.1% to 3%, and or from 0.2% to 2.5%, by weight of the detergent composition.

Polyvinylpyrrolidone ("PVP") has an amphiphilic character with a highly polar amide group conferring hydrophilic and polar attracting properties, and also has a polar methylene and methane groups, in the backbone and/or the ring, conferring hydrophobic properties. The rings may also provide planar alignment with the aromatic rings, in the dye molecules. PVP is readily soluble in aqueous and organic solvent systems. PVP is commercially available in either powder or aqueous solutions in several viscosity grades. The compositions of the present invention may employ a copolymer of N-vinylpyrrolidone and N-vinylimidazole (also abbreviated herein as "PVPVI"). It has been found that copolymers of N-vinylpyrrolidone and N-vinylimidazole can provide excellent dye transfer inhibiting performance. The copolymers of N-vinylpyrrolidone and N-vinylimidazole can have a molar ratio of N-vinylimidazole to N-vinylpyrrolidone from 1:1 to 0.2:1, optionally from 0.8:1 to 0.3:1, optionally from 0.6:1 to 0.4:1. The copolymer of N-vinylpyrrolidone and N-vinylimidazole can be either linear or branched. Particularly suitable polyvinylpyrrolidones (PVP), polyvinylimidazoles (PVI), and copolymers of vinylpyrrolidone and vinylimidazole (PVP/PVI), can have a weight average molecular weight of from 5,000 Da to 1,000,000 Da, optionally from 5,000 Da to 50,000 Da, optionally from 10,000 Da to 20,000 Da. The number average molecular weight range is determined by light scattering as described in Barth J. H. G. and Mays J. W. Chemical Analysis Vol 1 13. "Modern Methods of Polymer Characterization." Copolymers of poly (N-vinyl-2-pyrollidone) and poly (N-vinyl-imidazole) are commercially available from a number of sources including BASF. A preferred DTI is commercially available under the tradename SOKALAN HP 56 K from BASF (BASF SE, Germany).

Organic builder and/or chelant: The detergent composition can comprise from 0.6% to 10%, optionally from 2 to 7% by weight of one or more organic builder and/or chelants. Suitable organic builders and/or chelants can be selected from the group of: MEA citrate, citric acid, aminoalkylenepoly(alkylene phosphonates), alkali metal ethane 1-hydroxy disphosphonates, and nitrilotrimethylene, phosphonates, diethylene triamine penta (methylene phosphonic acid) (DTPMP), ethylene diamine tetra(methylene phosphonic acid) (EDTMP), hexamethylene diamine tetra(methylene phosphonic acid), hydroxy-ethylene 1,1 diphosphonic acid (HEDP), hydroxyethane dimethylene phosphonic acid, ethylene di-amine di-succinic acid (EDDS), ethylene diamine tetraacetic acid (EDTA), hydroxyethylethylenediamine triacetate (HEDTA), nitrilotriacetate (NTA), methylglycinediacetate (MGDA), iminodisuccinate (IDS), hydroxyethyliminodisuccinate (HIDS), hydroxyethyliminodiacetate (HEIDA), glycine diacetate (GLDA), diethylene triamine pentaacetic acid (DTPA), catechol sulfonates such as TIRON™ and mixtures thereof.

Enzymes: The detergent composition can comprise enzymes. Examples of suitable enzymes include, but are not limited to, hemicellulases, peroxidases, proteases, cellulases, xylanases, phospholipases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and known amylases, or combinations thereof. An optional enzyme combination comprises a cocktail of conventional detersive enzymes such as protease, lipase, cutinase and/or cellulase in conjunction with amylase. Detersive enzymes are described in greater detail in U.S. Pat. No. 6,579,839.

Additional enzymes can be present in the detergent composition, such that the additional enzyme or enzymes are present in the wash liquor at a level of from 0.001 to 2.5 ppm, optionally from 0.01 to 1.5 ppm, optionally from 0.025 to 0.75 ppm.

Enzyme stabilizer: Enzymes can be stabilized using any known stabilizer system such as calcium and/or magnesium compounds, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth)acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof.

Hueing dyes: The detergent composition may comprise fabric hueing agent (sometimes referred to as shading, bluing, or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and combinations thereof.

Optical brighteners: The detergent composition may comprise, based on the total detergent composition weight, from 0.005% to 2.0%, optionally from 0.01% to 0.1% of a fluorescent agent (optical brightener). Fluorescent agents are well known and many fluorescent agents are available commercially. Usually, these fluorescent agents are supplied and used in the form of their alkali metal salts, for example, the sodium salts. Preferred classes of fluorescent agent are: Di-styryl biphenyl compounds, e.g. TINOPAL CBS-X, Di-amine stilbene di-sulfonic acid compounds, e.g. TINOPAL DMS pure XTRA and BLANKOPHOR HRH, and Pyrazoline compounds, e.g. BLANKOPHOR SN. Optional fluorescers are: sodium 2-(4-styryl-3-sulfophenyl)-2H-napthol [1,2-d]trazole, disodium 4,4'-bis {[(4-anilino-6-(N methyl-N-2 hydroxyethyl) amino 1,3,5-triazin-2-yl)] amino}stilbene-2-2' disulfonate, disodium 4,4'-bis {[(4-anilino-6-morpholino-1,3,5-triazin-2-yl)]amino}stilbene-2-2' disulfonate, and disodium 4,4'-bis(2-sulfoslyryl) biphenyl.

Hydrotrope: The detergent composition may comprise, based on the total detergent composition weight, from 0 to 30%, optionally from 0.5 to 5%, optionally from 1.0 to 3.0%, hydrotrope, which can prevent liquid crystal formation. The addition of the hydrotrope thus aids the clarity/transparency of the composition. Suitable hydrotropes comprise but are not limited to urea, salts of benzene sulfonate, toluene sulfonate, xylene sulfonate or cumene sulfonate. Preferably, the hydrotrope is selected from the group of propylene glycol, xylene sulfonate, ethanol, and urea to provide optimum performance.

Particles: The detergent composition can also comprise particles, especially when the composition further comprises a structurant or thickener. The composition may comprise, based on the total composition weight, from 0.02% to 10%, optionally from 0.1% to 4.0%, optionally from 0.25% to 2.5% of particles. Said particles include beads, pearlescent agents, capsules, and mixtures thereof.

Fragrance ingredients may be provided in the detergent composition. Fragrance materials can be provided in capsules. Suitable capsules are typically formed by at least partially, preferably fully, surrounding a benefit agent with a wall material. Optionally, the capsule is a perfume capsule, wherein said benefit agent comprises one or more perfume raw materials. The capsule wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, resorcinol-based materials, poly-isocyanate-based materials, acetals (such as 1,3,5-triol-benzene-gluteraldehyde and 1,3,5-triol-benzene melamine), starch, cellulose acetate phthalate and mixtures thereof. Optionally, the capsule wall comprises melamine and/or a polyacrylate based material. The perfume capsule may be coated with a deposition aid, a cationic polymer, a non-ionic polymer, an anionic polymer, or mixtures thereof. Optionally, the perfume capsules have a volume weighted mean particle size from 0.1 microns to 100 microns, preferably from 0.5 microns to 60 microns.

The detergent composition can comprise organic solvent, optionally wherein the organic solvent is selected from the group consisting of: C1-C5 alkanols, C2-C6 diols, C3-C8 alkylene glycols, C3-C8 alkylene glycol mono lower alkyl ethers, glycol dialkyl ether, polyethylene glycols, C3-C9 triols, and mixtures thereof; more preferably wherein the organic solvent comprises C1-C5 alkanols, C2-C6 diols, C3-C9 triols, and mixtures thereof; optionally wherein the organic solvent comprises ethanol, 1,2-propanediol, glycerol, and mixtures thereof. The detergent composition can comprise organic solvent at a level of from 0.5% to 50%, optionally from 1.0% to 35%, optionally from 2.0% to 15% by weight of the detergent composition.

The detergent composition described herein can be packaged in any suitable container, including, but not limited to, those constructed from paper, cardboard, plastic materials, and any suitable laminates, for example polyethylene film lined paper board in with the polyethylene provided at 5% by weight of container or less. The detergent composition container may contain renewable and/or recyclable materials.

Acidic Treatment Composition

The acidic treatment composition can be provided such that the concentration of acid in the treatment liquor is from 50 ppm to 13500 ppm, optionally from about 500 ppm to about 11000 ppm, optionally from about 1500 ppm to about 10000 ppm. Optionally, the acidic treatment composition can be provided such that the concentration of acidic treatment composition in the treatment liquor is from 50 ppm to 13500 ppm, optionally from about 500 ppm to about 11000 ppm, optionally from about 1500 ppm to about 10000 ppm.

The acidic treatment composition can comprise citric acid, a sulfate or bisulfate, and a fragrance material. The acidic treatment composition can comprise from about 10% to about 99%, optionally from about 10% to 50%, by weight of the acidic treatment composition, of citric acid and/or a salt thereof; optionally from about 0.001% to about 1.0%, by weight of the acidic treatment composition, of a first sulfur-containing compound selected from a sulfate compound, a bisulfate compound, or a combination thereof; optionally a fragrance material; and from about 1% to about 90%, by weight of the acidic treatment composition, of water; optionally wherein the composition comprises less than 10%, by weight of the acidic treatment composition, of a material selected from the group of detersive surfactant, bleaching systems, fabric softening materials, and mixtures thereof; optionally wherein the acidic treatment composition is characterized by a neat pH of from about 2 to about 6.

The acidic treatment composition can optionally comprise fragrance material and a sulfate- or bisulfate-containing compound. Including a sulfate- or bisulfate-containing compound is believed to improve the color stability of the acidic treatment compositions that include fragrance materials versus comparative compositions. It is believed that some fragrance materials (also described herein as "perfume") have a tendency to experience a color change, altering the initial color a treatment composition. This discoloration may occur due to oxidation, interactions with other materials in the composition, or as a result of the pH.

The acidic treatment composition can be useful for softening fabric articles and/or for rejuvenating colors by removing limescale that may have accumulated on the fibers of the fabric article, which can result from washing one's fabric articles in hard water.

The acidic treatment composition can comprise citric acid and/or a salt thereof. The citric acid and a salt thereof may exist in an equilibrium in the liquid composition.

The acidic treatment composition may comprise from about 10% to about 90%, by weight of the liquid fabric care composition, of citric acid and/or a salt thereof. The acidic treatment composition may comprise from about 30% to about 60%, by weight of the acidic treatment composition, of citric acid and/or a salt thereof. The acidic treatment composition may comprise from about 15% to about 40%, optionally from about 20% to about 30%, by weight of the acidic treatment composition, of the citric acid and/or the salt thereof.

Optionally, the acidic treatment composition can comprise a first sulfur-containing compound. The first sulfur-containing compound can be selected from a sulfate compound, a bisulfate compound, or a combination thereof. The presence of a sulfate or bisulfate compound can reduce color instability in the acidic treatment composition, particularly in the presence of perfume.

The acidic treatment composition may comprise from about 0.001% to about 1.0%, by weight of the acidic treatment composition, of the first sulfur-containing compound, which is can be selected from a sulfate compound, a bisulfate compound, or a combination thereof. Acidic treatment composition may comprise from about 0.003% to about 0.1%, by weight of the acidic treatment composition, of the sulfur-containing compound, optionally from about 0.003% to about 0.01%. The acidic treatment composition may comprise from about 10 ppm to about 10,000 ppm, optionally from about 30 ppm to about 1000 ppm, optionally from about 30 ppm to about 100 ppm of the sulfur-containing compound.

The sulfur-containing compound can be selected from the group consisting of an alkali metal sulfate, an alkali metal bisulfate, an alkaline earth metal sulfate, an alkaline earth metal bisulfate, and combinations thereof. Optionally, the sulfur-containing compound can be selected from the group consisting of an alkali metal sulfate, an alkali metal bisulfate, sulfuric acid, and combinations thereof. Optionally, the sulfur-containing compound can comprise an alkali metal bisulfate, optionally sodium bisulfate. Such materials are both effective and readily available.

The sulfate-containing compound can be an inorganic sulfur-containing compound (e.g., sodium bisulfate). Inorganic sulfates and bisulfates are readily available, and can easily be incorporated into the acidic treatment compositions of the present disclosure, for example by dissolving.

The sulfur-containing compound is optionally not a surfactant, optionally not an alkyl sulfate or an alkoxylated alkyl sulfate. Surfactants such as these may not provide the same color stability benefits as the optional sulfates, and/or may undesirably adhere to fabric articles.

The acidic treatment compositions of the present disclosure can comprise a fragrance material (also herein "fragrance" or "perfume"). The fabric treatment composition can comprise from about 0.1% to about 20%, or from about 0.2% to about 10%, or from about 0.3% to about 5%, by weight of the composition, of fragrance materials.

Non-limiting examples of fragrance materials include, but are not limited to, aldehydes, ketones, esters, and the like. Other examples include various natural extracts and essences which can comprise complex mixtures of ingredients, such as orange oil, lemon oil, rose extract, lavender, musk, patchouli, balsamic essence, sandalwood oil, pine oil, cedar, and the like.

The fragrance material may comprise aldehydic perfume raw materials. Without wishing to be bound by theory, it is believed that while aldehydic perfume raw materials are often desirable from an olfactory/freshness point of view, they may also have a tendency to discolor. Thus, via the inclusion of sulfate or bisulfate compounds that mitigate color instability, such aldehydic materials may more conveniently be used in the acidic treatment composition of the present disclosure.

The aldehydic perfume raw materials may be present at a level of from about 5% to about 75%, optionally from about 10% to about 50%, by weight of the fragrance material.

Suitable aldehydic perfume raw materials may include: methyl nonyl acetaldehyde: benzaldehyde; floralozone; isocyclocitral; triplal (ligustral); precyclemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; or mixtures thereof.

At least a portion of the fragrance materials of the present disclosure may be derived from naturally sourced materials. At least about 50%, or at least about 60%, or at least about 70%, or at least about 80%, or at least about 90%, or at least about 95%, or about 100%, by weight of the fragrance materials, of the fragrance materials may be naturally derived fragrance materials.

For the acidic treatment composition of the present disclosure, it may be desirable for the fragrance materials to be relatively hydrophilic. Hydrophilic fragrance materials are more likely to adequately dissolve or disperse in the aqueous compositions of the present disclosure, leading to improved phase stability and/or product transparency.

Because the acidic treatment composition of the present disclosure is characterized by a relatively low pH, the fragrance materials are desirably acid-stable, particularly at the pH of the acidic treatment composition. Acid stability may qualitatively be shown by the lack of phase separation, a lack of discoloration, and/or a lack of precipitate formation at an acidic pH upon storage, optionally at a pH of from about 2 to about 4.

To facilitate convenient incorporation of the fragrance material into the acidic treatment composition of the present disclosure, the fragrance material may be mixed with a nonionic surfactant or other emulsifier prior to being mixed with the water and/or citric acid. Put another way, the acidic treatment composition may be made by a process in which the fragrance material is mixed with nonionic surfactant prior to being mixed with the citric acid.

The acidic treatment composition of the present disclosure can be an aqueous composition. The acidic treatment composition can comprise water. The acidic treatment composition may comprise from about 10% to about 90%, by weight of the acidic treatment composition, of water. The acidic treatment composition may comprise from about 50% to about 90% water, optionally from about 60% to about 85%, optionally from about 70% to about 80%, by weight of the acidic treatment composition.

The acidic treatment composition may further comprise organic solvent, which can improve composition stability, ingredient dissolution, and/or transparency of the acidic treatment composition. The acidic treatment composition may include from about 0.1% to about 30%, or from about 1% to about 20%, by weight of the composition, of organic solvent. Suitable organic solvents may include ethanol, diethylene glycol (DEG), 2-methyl-1,3-propanediol (MPD), monopropylene glycol (MPG), dipropylene glycol (DPG), oligamines (e.g., diethylenetriamine (DETA), tetraethylenepentamine (TEPA)), glycerine, propoxylated glycerine, ethoxylated glycerine, ethanol, 1,2-propanediol (also referred to as propylene glycol), 1,3-propanediol, 2,3-butanediol, cellulosic ethanol, renewable propylene glycol, renewable monopropylene glycol, renewable dipropylene glycol, renewable 1,3-propanediol, and mixtures thereof. One or more of the organic solvents may be bio-based, meaning that they are derived from a natural/sustainable, non-geologically-derived (e.g., non-petroleum-based) source.

The acidic treatment composition of the present disclosure may comprise a hydrotrope, such as sodium cumene sulphonate (SCS), which may help with the stability of the acidic treatment composition.

The acidic treatment composition of the present disclosure may comprise nonionic surfactant, which may help with product stability and/or incorporation of the fragrance materials. The acidic treatment composition may comprise from about 0.1 to about 8%, optionally from about 1% to about 5%, by weight of the acidic treatment composition, of nonionic surfactant. The nonionic surfactant is optionally an ethoxylated fatty alcohol. The nonionic surfactant may be premixed with the fragrance materials.

In addition to the citric acid and/or salt thereof, the acidic treatment composition may further comprise an additional organic acid. The additional organic acid may be selected from the group consisting of acetic acid, lactic acid, adipic acid, aspartic acid, carboxymethyloxymalonic acid, carboxymethyloxysuccinic acid, glutaric acid, hydroxyethyliminodiacetic acid, iminodiactic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof, optionally acetic acid. It may be preferred that the composition is substantially free of an additional organic acid. The acidic treatment composition can be free of or substantially free of acetic acid, which can add undesirable odors.

The acidic treatment compositions of the present disclosure is acidic. A low pH is believed to facilitate the benefits provided (e.g., limescale removal) by the acidic treatment composition. For example, the acidic treatment composition may be characterized by a neat pH of from about 2 to about 6, optionally from about 2 to about 5, optionally from about 2 to about 4, optionally from about 2 to about 3. These ranges of pH are believed to facilitate the performance efficacy of the citric acid and/or salts thereof.

The acidic treatment composition of the present disclosure may comprise a neutralizing agent, which can aid in achieving a desired pH. The neutralizing agent can be a caustic neutralizing agent, optionally sodium hydroxide (NaOH). It is believed that strong bases, such as caustic neutralizing agents like NaOH, can provide physical stability benefits relative to weak bases, such as monoethanolamine (MEA).

The acidic treatment composition may comprise less than 10%, by weight of the liquid fabric care composition, of a material selected from the group consisting of detersive surfactant, bleaching systems, fabric softening materials, and mixtures thereof. The acidic treatment composition may comprise less than 8%, optionally less than 5%, optionally less than 4%, optionally less than 2.5%, optionally less than 1%, or even be substantially free of a material selected from the group consisting of detersive surfactant, bleaching systems, and/or fabric softening materials. Such materials may affect the aesthetics, physical stability, and/or chemical stability of the other ingredients in the acidic treatment composition. Additionally or alternatively, certain such materials may not be physically or chemically stable themselves in low-pH environment of the present compositions. Furthermore, consumers who use acidic treatment composition may be hoping to remove materials from their treated fabrics articles, whereas at least some of the aforesaid materials may instead deposit on fabric articles during a normal treatment cycle, building up undesirable residues.

The acidic treatment composition may be substantially free of detersive surfactants, including anionic, nonionic, amphoteric, and/or zwitterionic surfactants. Anionic surfactants may include: sulfated surfactants, such as alkyl sulfate or alkoxylated alkyl sulfate; sulfonated surfactants, such as (linear) alkyl benzene sulfonates; and/or carboxylated surfactants. Nonionic surfactants may include: alkoxylated fatty alcohols; alkoxylated alkyl phenols; and/or alkyl polyglucosides. Zwitterionic surfactants may include amine oxide and/or betaines.

The acidic treatment composition may comprise less than 5%, preferably less than 3%, more preferably less than 1%, even more preferably less than 0.1%, by weight of the composition, of anionic surfactant.

As mentioned above, acidic treatment composition may comprise nonionic surfactant. When the acidic treatment composition comprises a nonionic surfactant, the composition may be substantially free of other (non-nonionic) surfactants.

The acidic treatment composition may be substantially free of bleaching systems. Bleaching systems may include peroxide bleaches, such as hydrogen peroxide and/or sources of peroxide. Bleaching systems may include hypohalite bleaches, such as hypochlorite bleaches, or sources of such hypohalites. Bleaching systems may also include bleach activators, such as NOBS or TAED, or bleach catalysts.

The acidic treatment composition may be substantially free of fabric softening materials. Such materials may deposit on fabric, which may be less preferred for certain consumers, applications, or fabric articles. Additionally, or alternatively, such materials may require emulsification or other processing to make them compatible with the present acidic treatment composition. Fabric softening materials may be cationically charged and/or capable of becoming cationically charged in typical wash conditions. Fabric softening materials may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The acidic treatment composition of the present disclosure may be relatively transparent. For example, the fabric treatment composition may be characterized by a percent transmittance (% T) of at least about 60% of light using a one-centimeter cuvette, at a wavelength of about 410-800 nanometers when the acidic treatment composition is substantially free of dyes.

As described above, the acidic treatment composition may be relatively transparent. Therefore, the acidic treatment composition may be substantially free of particles, such as encapsulated benefit agents, silicone droplets, pearlescent agents, and/or opacifiers, which may reduce the relative transparency of the acidic treatment composition. The acidic treatment composition may be substantially free of optical brighteners. The acidic treatment composition may be substantially free of dyes.

The acidic treatment composition of the present disclosure may be characterized by a relatively low viscosity. Such viscosities may be desirable for convenient pouring and/or little hang-up in a machine's dispenser drawer. The acidic treatment composition may be characterized by a viscosity of from about from about 0 to about 200 cps, optionally from about 0 to about 100 cps, optionally from about 0 to about 60 cps, as determined by rotational viscometry using a Brookfield viscometer and ASTM D 2196-99 at 60 RPM and 22° C.

In an effort to keep viscosity low, the acidic treatment composition of the present disclosure may be substantially free of thickeners or other rheology enhancers, such as structurants. The acidic treatment composition may be substantially free of salts, such as inorganic salts like sodium chloride, magnesium chloride, and/or calcium chloride, that can provide rheology modification such as thickening.

The acidic treatment composition described herein can be packaged in any suitable container, including, but not limited to, those constructed from paper, cardboard, plastic materials, and any suitable laminates, for example polyethylene film lined paper board in with the polyethylene provided at 5% by weight of container or less. The acidic treatment composition container may contain renewable and/or recyclable materials.

Tertiary Treatment Composition

The tertiary treatment composition can be selected from the group of: a fabric softening composition comprising from about 2% to about 20% by weight of said fabric softening composition a fabric softening active; a scent additive composition comprising from about 1% to about 100% by weight of the scent additive composition perfume; a fabric softening composition comprising perfume and from about 2% to about 20% by weight of the fabric softening composition a fabric softening active; and an emulsion comprising an aminoalkyl containing polyorganosiloxane or silicone resin. The fabric softening composition comprising perfume can comprise from about 1% to about 20% by weight of the fabric softening composition perfume.

For a tertiary treatment composition that comprises a fabric softening active, the fabric softening active can be present in the tertiary liquor at a level from about 300 ppm to about 10000 ppm, optionally from about 350 ppm to about 8700 ppm. Optionally, For a tertiary treatment composition that comprises a fabric softening composition, the fabric softening composition can be present in the tertiary liquor at a level from about 300 ppm to about 10000 ppm, optionally from about 350 ppm to about 8700 ppm. Similarly, for a tertiary treatment composition that comprises aminoalkyl containing polyorganosiloxane or silicone resin, the aminoalkyl containing polyorganosiloxane or silicone resin can be present in the tertiary liquor at a level from about 300 ppm to about 10000 ppm, optionally from about 350 ppm to about 8700 ppm. Similarly, for a tertiary treatment composition that comprises an emulsion comprising aminoalkyl containing polyorganosiloxane or silicone resin, the emulsion can be present in the tertiary liquor at a level from about 300 ppm to about 10000 ppm, optionally from about 350 ppm to about 8700 ppm.

The tertiary treatment composition can be selected from the group of from about 2% to about 20% by weight of the tertiary treatment composition a fabric softening active, from about 1% to about 100% by weight of the tertiary treatment composition a perfume, and combinations thereof.

The tertiary treatment composition can be a fabric softening composition. The fabric softening composition can comprise alkyl quaternary ammonium ester materials, also often called "ester quats". Such ester quats are useful for providing conditioning benefits such as softness, anti-wrinkle, anti-static, conditioning, anti-stretch, color, and/or appearance benefits to target fabric articles. The fabric softening composition can be provided in the tertiary liquor such that the level of softening active is present in tertiary liquor at a level from about 50 ppm to about 500 ppm, optionally from about 100 ppm to about 400 ppm, optionally from about 150 ppm to about 300 ppm.

The tertiary treatment composition may comprise from 2% to 20%, or from 2% to 15%, or from 2% to 8%, by weight of the tertiary treatment composition, of ester quat softening active. The ester quat softening active can be present in the tertiary liquor at a level of greater than 50 ppm or from 50 ppm to 500 ppm, optionally from 100 ppm to 400 ppm, optionally from 150 ppm to 300 ppm.

Suitable quaternary ammonium ester softening actives include, but are not limited to, materials selected from the group of: monoester quats, diester quats, triester quats and mixtures thereof. Optionally, the level of monoester quat can be from 2.0% to 40.0%, the level of diester quat can be from 40.0% to 98.0%, the level of triester quat can be from 0.0% to 25.0% by weight of total quaternary ammonium ester softening active.

Suitable quaternary ammonium ester softening active may comprise compounds of the following formula:

{R2(4-*m*)-N+-[X-Y—R1]*m*} A- wherein:

m is 1, 2 or 3 with proviso that the value of each m is identical;

each R1 is independently hydrocarbyl, or branched hydrocarbyl group, preferably R1 is linear, more preferably R1 is partially unsaturated linear alkyl chain;

each R2 is independently a C1-C3 alkyl or hydroxyalkyl group, preferably R2 is selected from methyl, ethyl, propyl, hydroxyethyl, 2-hydroxypropyl, 1-methyl-2 hydroxyethyl, poly(C2-3¬alkoxy), polyethoxy, benzyl;

each X is independently —(CH2)n-, —CH2-CH(CH3)- or —CH(CH3)-CH2- and each n is independently 1, 2, 3 or 4, preferably each n is 2;

each Y is independently —O—(O)C— or —C(O)—O—;

A- is independently selected from the group consisting of chloride, methyl sulfate, and ethyl sulfate, optionally A- is selected from the group consisting of chloride and methyl sulfate;

with the proviso that when Y is —O—(O)C—, the sum of carbons in each R1 is from 13 to 21, preferably from 13 to 19. Optionally, X is —CH2-CH(CH3)- or —CH (CH3)-CH2- to further improve the hydrolytic stability of the quaternary ammonium ester softening active, and hence further improve the stability of the liquid fabric softener composition.

Because of the balance of processability and odor of the quaternary ammonium ester softening active, optionally the iodine value of the parent fatty acid from which the quaternary ammonium fabric softening active is formed can be from 0 to 100, optionally from 10 to 60, or optionally from 15 to 45.

The ester quat softening actives are typically derived from fatty acid. The fatty acid may be partially hydrogenated, as such processes can provide the desired amount of trans fatty acids. By "partially hydrogenated" as used herein, it is meant that either the fatty acids themselves undergo a partial hydrogenation process, or that the oil from which the fatty acids are derived undergoes a hydrogenation process, or both. Additionally, partial hydrogenation processes reduce the amount of double-unsaturated fatty acids, the presence of which may lead to color and/or odor instabilities in final product.

The fatty acids can be derived from plants. Suitable sources of plant-derived fatty acids include vegetable oils, such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, and the like. Preferably, the fatty acid comprises fatty acids that are derived from cottonseed, rapeseed, sunflower seed, or soybean, preferably from cottonseed. These materials are particularly preferred because they tend to produce fatty acids having a desirable trans-unsaturation content upon partial hydrogenation.

The fatty acids may include an alkyl portion containing, on average by weight, from 13 to 22 carbon atoms, or from 14 to 20 carbon atoms, optionally from 16 to 18 carbon atoms, where the carbon count includes the carbon of the carboxyl group. The population of fatty acids may be present in a distribution of alkyl chains sizes.

The alkyl quaternary ammonium ester softening actives may comprise compounds formed from fatty acids that are unsaturated, meaning that the fatty acids comprise at least one double bond in the alkyl portion. The fatty acids may be mono-unsaturated (one double bond), or they may be di-unsaturated (or double-unsaturated; two double bonds).

Preferably, most of the unsaturated fatty acids in the fatty acid feedstock are mono-unsaturated.

The fatty acids may comprise unsaturated C18 chains, which may include a single double bond ("C18:1") or may be double unsaturated ("C18:2"). (For reference, a fatty acid with a saturated C18 chain may be referred to as "C18:0".) The fatty acid feedstock may comprise from 50% to 85%, preferably from 60% to about 80%, more preferably from 70% to 80%, by weight of the fatty acid feedstock, of C18 fatty acids, regardless of saturated or unsaturated status. The fatty acid feedstock may comprise from 20% to 60%, optionally from 40% to 60%, optionally from 45% to 55%, by weight of the fatty acid feedstock, of C18:0 fatty acids. The fatty acid feedstock may comprise from 15% to 50%, optionally from 15% to 30%, optionally from 18% to 25%, by weight of the fatty acid feedstock, of C18:1 fatty acids. The fatty acid feedstock may comprise from 0% (e.g., none) to 20%, or from 0% to 15%, or from 0% to 10%, or from 0% to 5%, by weight of the fatty acid feedstock, of C18:2 fatty acids. The fatty acid feedstock may comprise from 1% to 15%, preferably from 5% to 10%, by weight of the fatty acid feedstock, of C18:2 fatty acids.

The ester quat material can be produced in a two-step synthesis process. First, an esteramine can be produced by through an esterification reaction using fatty acids and an alkanolamine. In a second step, the product can be quaternized using an alkylating agent.

The liquid conditioning compositions of use in the present invention may comprise other conditioning agents in addition to the ester quats described above. The other conditioning agents may be selected from the group of quaternary ammonium ester compounds other than those described above, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof.

Examples of suitable quaternary ammonium ester softening actives are commercially available from KAO Chemicals under the trade name TETRANYL AT-1 and TETRANYL AT-7590, from Evonik under the tradename REWOQUAT WE16 DPG, REWOQUAT WE18, REWOQUAT WE20, REWOQUAT WE28, and REWOQUAT 38 DPG, from Stepan under the tradename STEPANTEX GA90, STEPANTEX VR90, STEPANTEX VK90, STEPANTEX VA90, STEPANTEX DC90, and STEPANTEX VL90A. These types of agents and general methods of making them are disclosed in U.S. Pat. No. 4,137,180.

The tertiary treatment composition can be a scent additive composition. The tertiary treatment composition can comprise from about 1% to about 100% by weight of the tertiary treatment composition a perfume. Optionally, the tertiary treatment composition can comprise a fabric softening composition that comprises from about 2% to about 20% by weight fabric softening active and from about 1% to about 20% by weight of the fabric softening composition perfume.

A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from the group consisting of ethanol, isopropanol, diethylene glycol monoethyl ether, dipropylene glycol, diethyl phthalate, triethyl citrate, and mixtures thereof.

The perfume can be provided as unencapsulated perfume. The perfume can be provided in a perfume delivery system. Zeolite and cyclodextrine are examples of perfume delivery systems. The perfume can be encapsulated in starch. For example an emulsion of starch and perfume oil can be spray dried to form particles of starch having droplets of perfume dispersed within the starch matrix. Perfume delivery systems can be particulate materials or fine particulate materials that may be difficult to handle in a manufacturing environment due to the possibility that the particles may become suspended in air.

The perfume can be encapsulated perfume. Encapsulated perfume is commonly employed in laundry products. Encapsulated perfume comprises a plurality of droplets of liquid perfume each of which are encapsulated in an encapsulate shell. Perfume may be encapsulated in a water soluble or water insoluble encapsulate shell. Encapsulate shell can comprise melamine-urea-formaldehyde, melamine formaldehyde, urea formaldehyde, starch, and the like materials. The encapsulate shell wall can be a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the encapsulate shell comprises an aminoplast, the aminoplast may comprise polyurea, polyurethane, and/or polyureaurethane. The polyurea may comprise polyoxymethyleneurea and/or melamine formaldehyde. Encapsulates having an encapsulate shell comprising a polysaccharide can be practical. The encapsulate shell can be selected from the group consisting of chitosan, gum arabic, alginate, β-glucan, starch, starch derivatives, plant proteins, gelatin, *alyssum* homolocarpum seed gum, and combinations thereof.

The perfume can comprise one or more fragrances of plant origin. A fragrance of plant origin is a concentrated hydrophobic liquid containing volatile chemical compound extracted from a plant. The fragrance of plant origin can be selected from the group consisting of allspice berry, *angelica* seed, anise seed, basil, bay laurel, bay, bergamot, blood orange, camphor, caraway seed, cardamom seed, carrot seed, *cassia*, catnip, cedarwood, celery seed, chamomile german, chamomile roman, cinnamon bark, cinnamon leaf, citronella, clary sage, clove bud, coriander seed, cypress, elemi, *eucalyptus*, fennel, fir needle, frankincense, geranium, ginger, grapefruit pink, helichrysum, hop, hyssop, juniper berry, labdanum, lavender, lemon, lemongrass, lime, *magnolia*, mandarin, marjoram, melissa, mugwort, myrrh, myrtle, neroli, niaouli, nutmeg, orange sweet, oregano, palmarosa, patchouli, pennyroyal, pepper black, peppermint, petitgrain, pine needle, *radiata*, ravensara, rose, rosemary, rosewood, sage, sandalwood, spearmint, spikenard, spruce, star anise, sweet annie, tangerine, tea tree, thyme red, *verbena*, vetiver, wintergreen, wormwood, yarrow, ylang ylang extra, and ylang ylang III, and mixtures thereof.

The tertiary treatment composition can be a combination of a fabric softening composition and scent additive composition.

The tertiary treatment composition can further comprise an adjunct agent selected from the group of waxes, hydrocarbons, higher fatty acids, essential oils, lipids, skin coolants, vitamins, sunscreens, antioxidants, catalysts, bleach particles, silicon dioxide particles, malodor reducing agents, odor-controlling materials, chelating agents, antistatic agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, soil release agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, dyes, and combinations thereof.

The tertiary treatment composition described herein can be packaged in any suitable container, including, but not limited to, those constructed from paper, cardboard, plastic materials, and any suitable laminates, for example polyethylene film lined paper board in with the polyethylene provided at 5% by weight of container or less. The tertiary treatment composition container may contain renewable and/or recyclable materials.

Process for Treating a Fabric Article

The present disclosure relates to a process for treating a fabric article. The process can include the steps of contacting the fabric article with a wash liquor of detergent composition and a first water, contacting the fabric article with a treatment liquor of acidic treatment composition and a second water, and contacting the fabric article with a tertiary liquor of tertiary treatment composition and a third water.

The process can be carried out in an automatic laundry washing machine 3 configured to provide for at least three treatment sub-cycles. During each sub-cycle a product can be provided into the drum, for example a detergent composition during the first laundry treatment sub-cycle, an acidic treatment composition during the second laundry treatment sub-cycle, and a tertiary treatment composition during the third laundry treatment sub-cycle. The compositions may be added manually or provided by way of single dose or multidose reservoirs. Optionally, the process can be carried out by hand washing. The automatic laundry washing machine 3 can comprise a rotatable drum 5 positioned within a static tub 4 (FIG. 1). To carry out the process in an automatic laundry washing machine 3, first a fabric article is provided within the rotatable drum of a washing machine. The user can select from the user interface of the machine to conduct the process. Optionally, the laundry washing machine 3 can be configured to acquire data or otherwise sense that the laundry washing machine has onboard the detergent composition, acidic treatment composition, and the tertiary treatment composition. Optionally, the user can input into a user interface or the laundry washing machine 3 can be configured to acquire data from the user or packaging that the user intends to carry out the three treatment sub-cycles and that the detergent composition, acidic treatment composition, and or the tertiary treatment composition are available.

The laundry washing machine can comprise three reservoirs 2, each of which contain one of the detergent composition, the acidic treatment composition, and the tertiary treatment composition. The reservoirs 2 may be a permanent fixture of the laundry washing machine or engageable with and disengageable from the laundry washing machine 3. The reservoirs 2 may be single use reservoirs 2 that the user fills with the applicable treatment composition before initiating a laundry treatment process. The reservoirs 2 may be trays into which the use pours the applicable treatment composition. The trays may be positioned within a drawer that can be pulled out to access the trays. The user can pull out the drawer and fill each tray with the applicable treatment composition. Once the trays have an appropriate dose of the applicable treatment composition, the drawer can be closed so that the trays, that is the reservoirs 2, are in position such that the reservoirs 2 are capable of being in fluid communication with the rotatable drum 5.

The reservoirs 2 can be integral with one another so that they are engaged with and disengaged from the laundry washing machine 3 as a single unit, by way of nonlimiting example as a multi-chamber cartridge. The reservoirs 2 can be in fluid communication with the rotatable drum 5 of the laundry washing machine so that the relevant treatment composition can be delivered to the drum 5 or tub 3 within which the drum resides. The reservoirs may contain one or more doses of treatment composition. The laundry washing machine 3 can be provided with a liquid delivery system 1 that can transport the detergent composition, the acidic treatment composition, and the tertiary treatment composition from their respective reservoirs 2 to the drum 5 or tub 4 within which the drum 5 resides. The reservoirs described herein can comprise any suitable material including, but not limited to, those constructed from paper, cardboard, plastic materials, and any suitable laminates (e.g. a laminate of paperboard and polyethylene film, the polyethylene film constituting less than 5% by weight of the reservoir). The reservoirs can comprise renewable and/or recyclable materials. The liquid delivery system 1 can be a pump, gravity, or mixed stream system. The liquid delivery system 1 can be a pump. Once the user initiates the laundry treatment process, the controller of the laundry washing machine 3 can open a valve that is connected to a water supply to commence filling of the tub and drum with the first water. In parallel with the filling of the tub and drum with the first water, the controller of the laundry washing machine can activate a pump to pump the detergent composition to mix with the first water, either in line with the water filling conduit or in the tub or drum. Optionally, the liquid delivery system 1 can be a gravity driven system. In such an arrangement, the controller can open a valve to permit the detergent composition to flow into the water filling conduit or into the tub 4 or drum 5. The liquid delivery system 1 can be a mixed stream system in which pressurized water flushes the detergent composition from its reservoir 2, the mixture then flowing by pressure driven flow, for example by momentum of the water, a pump, or gravity flow to the drum 5 or tub 4 within which the drum 5 resides.

The first laundry treatment sub-cycle can comprise the steps of providing a detergent composition to the washing machine 3 as described previously. A wash liquor is provided in the drum 5. The wash liquor is formed by combining the detergent composition and a first water. The first water may be provided by a single water line, for example hot or cold, or may be a mixture of hot and cold water, or may be a water provided at a desired temperature in some manner. The first water may be tap water, hot, cold, or a mixture thereof.

The wash liquor is then contacted to the fabric article in the drum 5. The wash liquor may be contacted to the fabric article while the drum 5 is static, rotating, or oscillating, or any combination of such states of the drum occurring in series. The wash liquor can act to remove detritus from the fabric article. The wash liquor can treat the fabric article for example by depositing a hueing dye onto the fabric, contacting the fabric article with an enzyme capable of breaking down stains, or any other known treatment provided by a fully formulated laundry detergent. After the wash liquor is contacted to the fabric article, the wash liquor can be drained from the drum 5 and tub 4 housing the drum 5. Optionally, before, while, or after the wash liquor is drained from the drum 5, the fabric article can be rinsed, spun in the drum, or a combination thereof. Optionally a first rinse water can be applied to the fabric article before, while, or after the wash liquor is drained from the drum 5. Draining may occur by opening a drain valve from the tub 4 within which the drum 5 resides and the wash liquor and suspended detritus may drain by gravity or be assisted by a pump. The first laundry treatment sub-cycle can have a duration from about 2 minutes to about 2 hours, optionally from about 2 minutes to about 30 minutes. The wash liquor can be recirculated during the first laundry treatment sub-cycle. Optionally, the fabric article can be agitated during the first laundry treatment sub-cycle. The fabric article can be agitated for a duration from about 2 minutes to about 2 hours. The agitation can be at a rate of 1 to 90 revolutions per minute of the drum. After the first laundry treatment sub-cycle is completed, a second laundry treatment sub-cycle can be carried out. The controller of the laundry washing machine 3 can open a valve that is connected to a water supply to commence filling of the tub and drum with the second water. In parallel with the filling of the tub 4 and drum 5 with the second water, the controller of the laundry washing machine can activate a pump to pump the acidic treatment composition to mix with the second water, either in line with the water filling conduit or in the tub 4 or drum 5. Optionally, the liquid delivery system for delivering the acidic treatment composition can be a gravity driven system. In such an arrangement, the controller can open a valve to permit the acidic treatment composition to flow into the water filling conduit or into the tub or drum. The liquid delivery system can be a mixed stream system in which pressurized water flushes the acidic treatment composition from its reservoir 2, the mixture then flowing by pressure driven flow, for example by momentum of the water, a pump, or gravity flow to the drum 5 or tub 4 within which the drum 5 resides.

The second laundry treatment sub-cycle can comprise the step of providing an acidic treatment composition to the washing machine 3. A treatment liquor is provided in the drum 5. The treatment liquor can be formed by combining the acidic treatment composition and second water. The second water may be provided by a single water line, for example hot or cold, or may be a mixture of hot and cold water, or may be a water provided at a desired temperature in some manner. The second water may be compositionally the same as the first water and may be at the same or different temperature as the first water. The second water may be tap water, hot, cold, or a mixture thereof. The term second water is used in the sense in that the words first, second, and third, as subsequently described and used herein, are used as a temporal descriptions. The second follows the first. And the third follows the second. And the second is between the first and third.

The treatment liquor is then contacted to the fabric article. The treatment liquor may be contacted to the fabric article while the drum 5 is static, rotating, or oscillating, or any combination of such states of the drum 5 occurring in series. The treatment liquor can act to treat the fabric article. After the treatment liquor is contacted to the fabric article, the treatment liquor can be drained from the drum 5 and tub 4 within which the drum 5 is housed. Optionally, before, while, or after the treatment liquor is drained from the drum 5, the fabric article can be rinsed, spun in the drum, or a combination thereof. Optionally a second rinse water can be applied to the fabric article before, while, or after the treatment liquor is drained from the drum 5. Draining may occur by opening a drain valve from the tub within which the drum 5 resides and the wash liquor may drain by gravity or be assisted by a pump. Optionally, the fabric article can be rinsed after the treatment liquor is drained from the drum 5. The second laundry treatment sub-cycle can have a duration from about 2 minutes to about 2 hours, optionally from about 2 minutes to about 30 minutes. The treatment liquor can be recirculated during the second laundry treatment sub-cycle. Optionally, the fabric article can be agitated during the second laundry treatment sub-cycle. The fabric article can be agitated for a duration from about 2 minutes to about 2 hours. The agitation can be at a rate of 1 to 90 revolutions per minute of the drum.

Optionally, the first laundry treatment sub-cycle and second laundry treatment sub-cycle described above can be conducted in reverse order. The first laundry treatment sub-cycle can be an application of an acidic treatment composition and the second laundry treatment sub-cycle can be an application of a detergent composition. That is, the first laundry treatment sub-cycle can comprise the steps of: providing an acidic treatment composition to the washing machine, wherein the acidic treatment composition comprises: from about 10% to 99% by weight of the acidic treatment composition organic acid; providing within the drum a treatment liquor formed by combining the acidic treatment composition and a first water; and contacting the treatment liquor to the fabric article. The second laundry treatment sub-cycle can comprise the steps of providing a detergent composition to said washing machine, wherein the detergent composition comprises: from about 10% to about 80% by weight of the detergent composition anionic surfactant; and from about 10% to about 80% by weight of the detergent composition nonionic surfactant; providing within the drum a wash liquor formed by combining the detergent composition and a second water; and contacting the wash liquor to the fabric article. After the second treatment sub-cycle is completed, a third laundry treatment sub-cycle can be carried out. The controller of the laundry washing machine 3 can open a valve that is connected to a water supply to commence filling of the tub 4 and drum 5 with the third water. In parallel with the filling of the tub and drum 5 with the third water, the controller of the laundry washing machine 3 can activate a pump to pump the tertiary treatment composition to mix with the third water, either in line with the water filling conduit or in the tub 4 or drum 5. Optionally, the liquid delivery system for delivering the tertiary treatment composition can be a gravity driven system. In such an arrangement, the controller can open a valve to permit the tertiary treatment composition to flow into the water filling conduit or into the tub 4 or drum 5. The liquid delivery system can be a mixed stream system in which pressurized water flushes the tertiary treatment composition from its reservoir, the mixture then flowing by pressure driven flow, for example by momentum of the water, a pump, or gravity flow to the drum 5 or tub 4 within which the drum 5 resides.

The third laundry treatment sub-cycle can comprise the step of providing a tertiary treatment composition to the washing machine 3. A tertiary liquor is provided in the drum 5. The tertiary liquor can be formed by combining the tertiary treatment composition and a third water. The third water may be provided by a single water line, for example hot or cold, or may be a mixture of hot and cold water, or may be a water provided at a desired temperature in some manner. The third water may be compositionally the same as the first water and or second water and may be at the same or different temperature as the first water and or second water. The third water may be tap water, hot, cold, or a mixture thereof.

The tertiary liquor is then contacted to the fabric article. The tertiary liquor may be contacted to the fabric article while the drum 5 is static, rotating, or oscillating, or any combination of such states of the drum 5 occurring in series. The tertiary liquor can act to contact a fabric softening composition to the fabric article, contact a scent additive composition to the fabric article, and or contact a fabric softening composition that comprises a perfume to the fabric article. After the tertiary liquor is contacted to the fabric article, the tertiary liquor can be drained from the drum 5 and tub 4 housing the drum 5. Optionally, before, while, or after the tertiary liquor is drained from the drum 5, the fabric article can be rinsed, spun in the drum, or a combination thereof. Optionally a third rinse water can be applied to the fabric article before, while, or after the tertiary liquor is drained from the drum 5. Draining may occur by opening a drain valve from the tub 4 within which the drum 5 resides and the tertiary liquor may drain by gravity or be assisted by a pump. The third laundry treatment sub-cycle can have a duration from about 2 minutes to about 2 hours, optionally from about 2 minutes to about 30 minutes. The tertiary liquor can be recirculated during the third laundry treatment sub-cycle. Optionally, the fabric article can be agitated during the third laundry treatment sub-cycle. The fabric article can be agitated for a duration from about 2 minutes to about 2 hours. The agitation can be at a rate of 1 to 90 revolutions per minute of the drum.

Optionally the third laundry treatment sub-cycle can be a repeat of the first laundry treatment cycle. For example, the first laundry treatment sub-cycle can be applying an acidic treatment composition, the second laundry treatment sub-cycle can be applying a detergent composition, and the third laundry treatment sub-cycle can be applying an acidic treatment composition. That is, the first laundry treatment sub-cycle can comprise the steps of: providing an acidic treatment composition to the washing machine, wherein the acidic treatment composition comprises: from about 10% to 99% by weight of the acidic treatment composition organic acid; providing within the drum a treatment liquor formed by combining the acidic treatment composition and a first water; and contacting the treatment liquor to the fabric article. Optionally, the treatment liquor can be recirculated during the first laundry treatment sub-cycle and the third laundry treatment sub-cycle. Optionally, the fabric article can be agitated during the first laundry treatment sub-cycle. The fabric article can be agitated for a duration from about 2 minutes to about 2 hours. The agitation can be at a rate of 1 to 90 revolutions per minute of the drum. The second laundry treatment sub-cycle can comprise the steps of providing a detergent composition to said washing machine, wherein the detergent composition comprises: from about 10% to about 80% by weight of the detergent composition anionic surfactant; and from about 10% to about 80% by weight of the detergent composition nonionic surfactant; providing within the drum a wash liquor formed by combining the detergent composition and a second water; and contacting the wash liquor to the fabric article. Optionally, the wash liquor can be recirculated during the second laundry treatment sub-cycle. Optionally, the fabric article can be agitated during the second laundry treatment sub-cycle. The fabric article can be agitated for a duration from about 2 minutes to about 2 hours. The agitation can be at a rate of 1 to 90 revolutions per minute of the drum. The third laundry treatment sub-cycle can comprise the steps of: providing an acidic treatment composition to the washing machine, wherein the acidic treatment composition comprises: from about 10% to 99% by weight of the acidic treatment composition organic acid; providing within the drum a treatment liquor formed by combining the acidic treatment composition and a third water; and contacting the treatment liquor to the fabric article. Optionally, the treatment liquor can be recirculated during the third laundry treatment sub-cycle and the third laundry treatment sub-cycle. Optionally, the fabric article can be agitated during the third laundry treatment sub-cycle. The fabric article can be agitated for a duration from about 2 minutes to about 2 hours. The agitation can be at a rate of 1 to 90 revolutions per minute of the drum.

Between the laundry treatment sub-cycles described above, the fabric article can have a remaining moisture content from about 2% to about 100% by weight of the fabric article.

Figure 2:
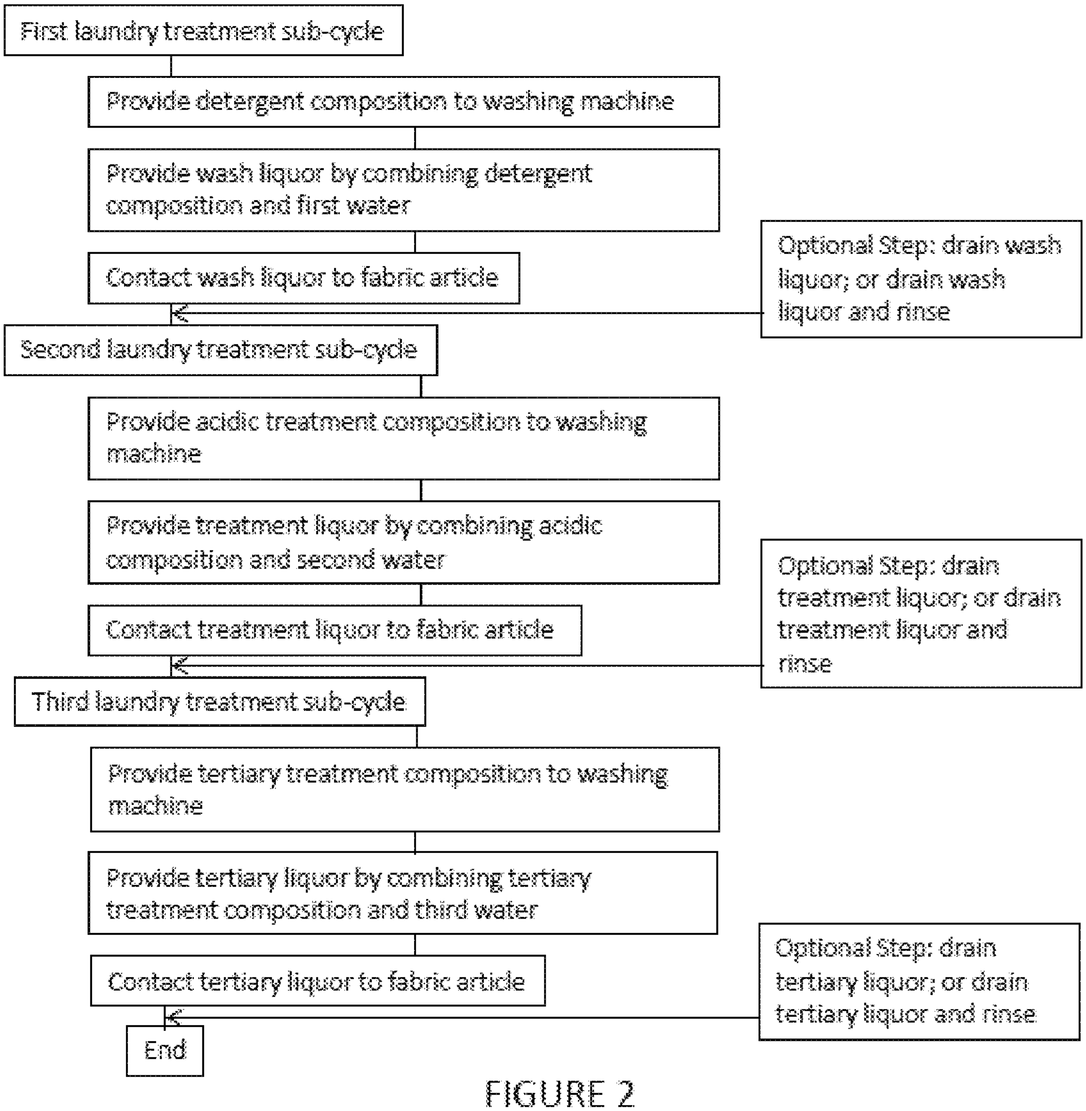
FIG. 2 is a flowchart of an embodiment of a process for treating a fabric article.
Figure 3:
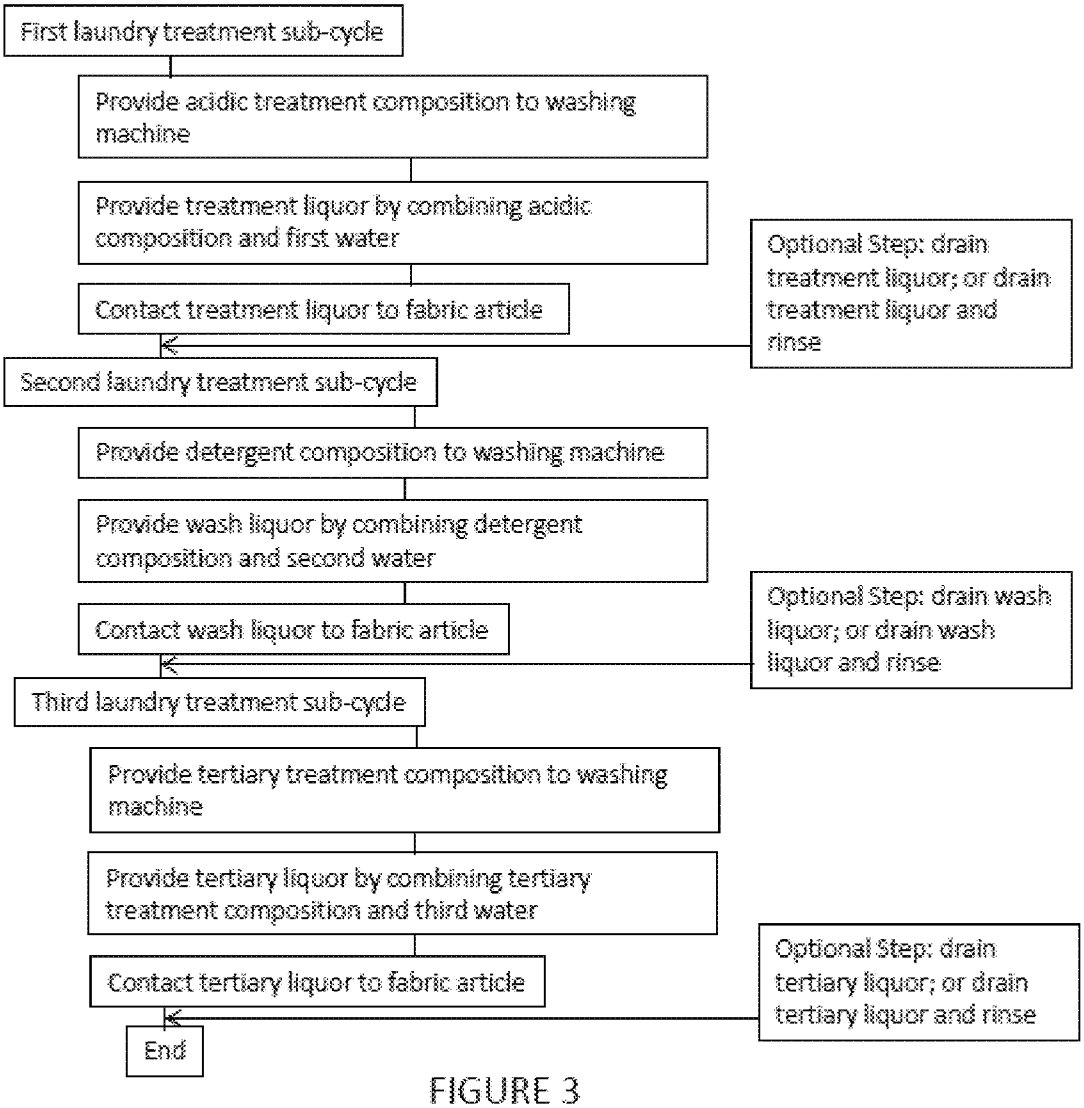
FIG. 3 is a flowchart of an embodiment of a process for treating a fabric article.
Figure 4:
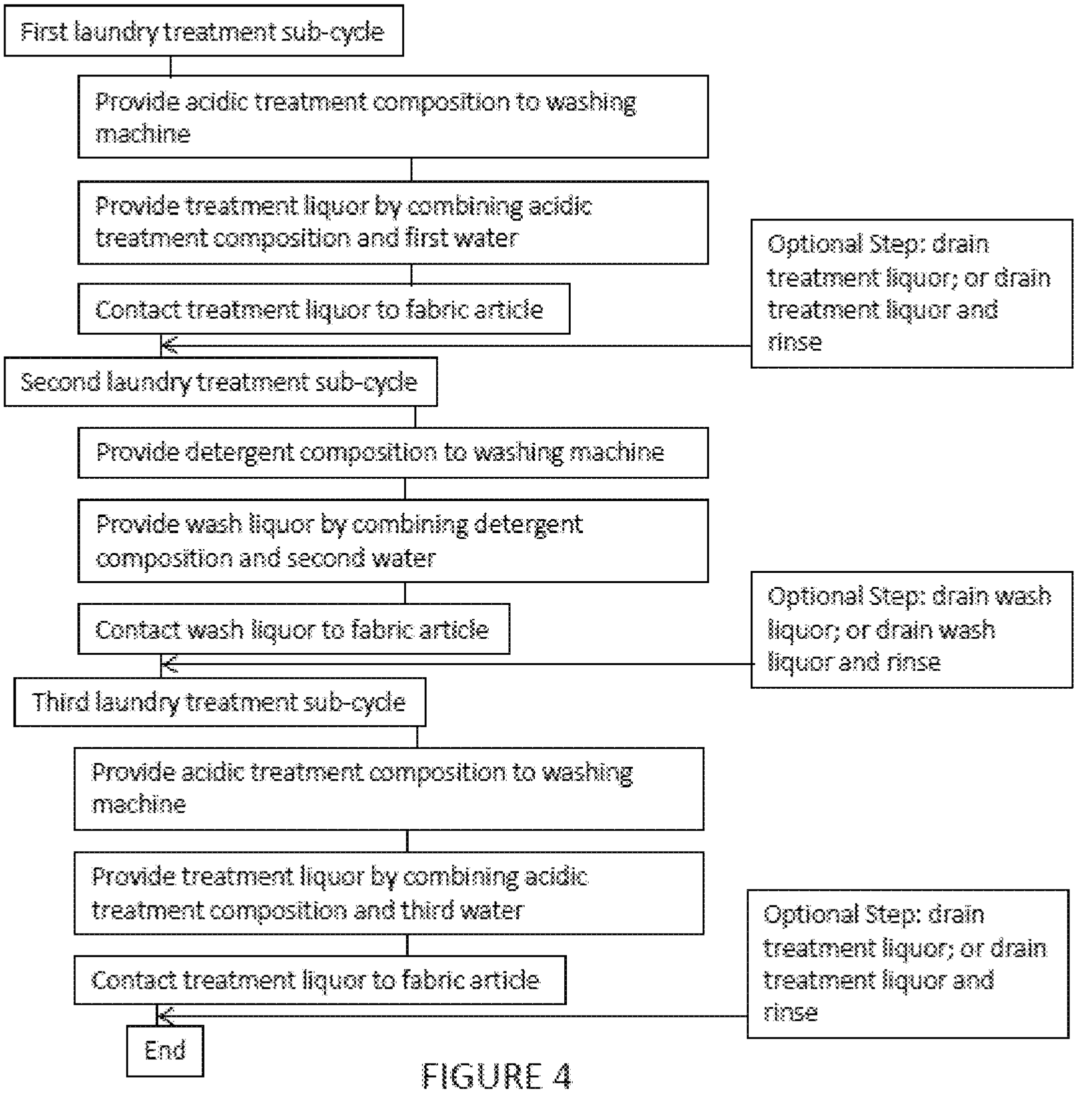
FIG. 4 is a flowchart of an embodiment of a process for treating a fabric article.

Flowcharts of embodiments of a process for treating a fabric article are shown in FIGS. 2 to 4. Each laundry treatment sub-cycle can have a duration from about 2 minutes to about 2 hours, optionally from about 2 minutes to about 30 minutes.

Packaging

The detergent composition, acidic treatment composition, tertiary treatment composition may be packaged in transparent or translucent containers. Container materials that may be used include, but are not limited to: polypropylene (PP), polyethylene (PE), polycarbonate (PC), polyamides (PA) and/or polyethylene terephthalate (PETE), polyvinylchloride (PVC); and polystyrene (PS). Recyclable materials may be preferred for environmental reasons. The detergent composition, acidic treatment composition, tertiary treatment composition may be packaged in multi-chamber container or a cartridge having multiple chambers.

The containers may be of any form or size suitable for storing and packaging liquids for household use. For example, the container may have any size but usually the container will have a maximal capacity of about 0.05 to about 15 L, or about 0.1 to about 5 L, or from about 0.2 to about 2.5 L. The container may be suitable for easy handling. For example, the container may have handle or a part with such dimensions to allow easy lifting or carrying the container with one hand. The container may have a means suitable for pouring a liquid detergent composition and means for reclosing the container. The pouring means may be of any size or form. The closing means may be of any form or size (e.g., to be screwed or clicked on the container to close the container). The closing means may be cap, which can be detached from the container. Alternatively, the cap may be attached to the container, whether the container is open or closed. The closing means may also be incorporated in the container.

Combinations and Examples

An Example follows:

A. A process for treating a fabric article comprising steps of:

providing a fabric article within a rotatable drum within a washing machine;

conducting a first laundry treatment sub-cycle comprising steps of:

providing a detergent composition to said washing machine, wherein said detergent composition comprises:

from about 10% to about 80% by weight of the detergent composition anionic surfactant; and from about 10% to about 80% by weight of the detergent composition nonionic surfactant;

providing within said drum a wash liquor formed by combining said detergent composition and a first water; and contacting said wash liquor to said fabric article;

conducting a second laundry treatment sub-cycle comprising steps of:

providing an acidic treatment composition to said washing machine, wherein said acidic treatment composition comprises:

from about 10% to 99% by weight of said acidic treatment composition organic acid;

providing within said drum a treatment liquor formed by combining said acidic treatment composition and a second water; and contacting said treatment liquor to said fabric article;

conducting a third laundry treatment sub-cycle comprising the steps of:

providing a tertiary treatment composition to said washing machine, wherein said tertiary treatment composition is selected from the group of: a fabric softening composition comprising from about 2% to about 20% by weight of said fabric softening composition a fabric softening active; a scent additive composition comprising from about 1% to about 100% by weight of said scent additive composition a perfume; a fabric softening composition comprising a perfume and from about 2% to about 20% by weight of the fabric softening composition a fabric softening active; and an emulsion comprising an aminoalkyl containing polyorganosiloxane or silicone resin;

providing within said drum a tertiary liquor formed by combining said tertiary treatment composition and a third water; and contacting said tertiary liquor to said fabric article and thereafter draining said tertiary liquor or a water dilution thereof from said drum and rinsing said fabric article.

B. The process according to Paragraph A, wherein after contacting said wash liquor to said fabric article and before conducting said second laundry treatment sub-cycle, at least a portion of said wash liquor is drained from said drum.

C. The process according to Paragraph A or B, wherein a first rinse water is applied to said fabric article before, while, or after said wash liquor is drained from said drum.

D. The process according to any of Paragraphs A to C, wherein before, while, or after said wash liquor is drained from said drum, said fabric article is rinsed, spun in the drum, or a combination thereof.

E. The process according to any of Paragraphs A to D, wherein after contacting said treatment liquor to said fabric article and before conducting said third laundry treatment sub-cycle, at least a portion of said treatment liquor is drained from said drum.

F. The process according to Paragraph E, wherein a second rinse water is applied to said fabric article before, while, or after said treatment liquor is drained from said drum.

G. The process according to Paragraph E or F, wherein before, while, or after said treatment liquor is drained from said drum, said fabric article is rinsed, spun in the drum, or a combination thereof.

H. The process according to any of Paragraphs A to G, wherein a third rinse water is applied to said fabric article before, while, or after said tertiary liquor is drained from said drum.

I. The process according to any of Paragraphs A to H, wherein before, while, or after said tertiary liquor is drained from said drum, said fabric article is rinsed, spun in the drum, or a combination thereof.

J. The process according to any of Paragraphs A to I, wherein after contacting said treatment liquor to said fabric article, said treatment liquor is drained from said drum and said fabric article is rinsed.

K. The process according to any of Paragraphs A to J, wherein said acidic treatment composition comprises from about 30% to about 50% by weight of said acidic treatment composition an organic acid.

L. The process according to any of Paragraphs A to K, wherein said tertiary treatment composition is said fabric softening composition.

M. The process according to any of Paragraphs A to K, wherein said tertiary treatment composition is said fabric softening composition, wherein said fabric softening composition comprises from about 1% to about 20% by weight of said fabric softening composition said perfume.

N. The process according to any of Paragraphs A to M, wherein said acidic treatment composition comprises from about 10% to 50% by weight of said acidic treatment composition an organic acid.

O. The process according to any of Paragraphs A to K, wherein said tertiary treatment composition is said scent additive and said scent additive composition comprises from about 1% to about 30% by weight of said scent additive composition perfume, or wherein said tertiary treatment composition is said emulsion and said emulsion comprises from about 2% to about 30% by weight of said emulsion said aminoalkyl containing polyorganosiloxane or silicone resin.

P. A process for treating a fabric article comprising steps of:

providing a fabric article within a rotatable drum within a washing machine;

conducting a first laundry treatment sub-cycle comprising steps of:

providing an acidic treatment composition to said washing machine, wherein said acidic treatment composition comprises:

from about 10% to 99% by weight of said acidic treatment composition organic acid;

providing within said drum a treatment liquor formed by combining said acidic treatment composition and a first water; and contacting said treatment liquor to said fabric article;

conducting a second laundry treatment sub-cycle comprising steps of:

providing a detergent composition to said washing machine, wherein said detergent composition comprises:

from about 10% to about 80% by weight of the detergent composition anionic surfactant; and from about 10% to about 80% by weight of the detergent composition nonionic surfactant;

providing within said drum a wash liquor formed by combining said detergent composition and a second water; and contacting said wash liquor to said fabric article;

conducting a third laundry treatment sub-cycle comprising the steps of:

providing a tertiary treatment composition to said washing machine, wherein said tertiary treatment composition is selected from the group of: a fabric softening composition comprising from about 2% to about 20% by weight of said fabric softening composition a fabric softening active; a scent additive composition comprising from about 1% to about 100% by weight of said scent additive composition a perfume; a fabric softening composition comprising a perfume and from about 2% to about 20% by weight of the fabric softening composition a fabric softening active; and an emulsion comprising an aminoalkyl containing polyorganosiloxane or silicone resin;

providing within said drum a tertiary liquor formed by combining said tertiary treatment composition and a third water; and contacting said tertiary liquor to said fabric article and thereafter draining said tertiary liquor or a water dilution thereof from said drum and rinsing said fabric article.

Q. The process according to Paragraph P, wherein after contacting said treatment liquor to said fabric article and before conducting said second laundry treatment sub-cycle, at least a portion of said treatment liquor is drained from said drum.

R. The process according to Paragraph P or Q, wherein a first rinse water is applied to said fabric article before, while, or after said treatment liquor is drained from said drum.

S. The process according to any of Paragraphs P to R, wherein before, while, or after said wash liquor is drained from said drum, said fabric article is rinsed, spun in the drum, or a combination thereof.

T. The process according to any of Paragraphs P to S, wherein after contacting said treatment liquor to said fabric article and before conducting said third laundry treatment sub-cycle, at least a portion of said wash liquor is drained from said drum.

U. The process according to Paragraph T, wherein a second rinse water is applied to said fabric article before, while, or after said treatment liquor is drained from said drum.

V. The process according to Paragraph T or U, wherein before, while, or after said treatment liquor is drained from said drum, said fabric article is rinsed, spun in the drum, or a combination thereof.

W. The process according to any of Paragraphs P to V, wherein a third rinse water is applied to said fabric article before, while, or after said tertiary liquor is drained from said drum.

X. The process according to any of Paragraphs P to W, wherein before, while, or after said tertiary liquor is drained from said drum, said fabric article is rinsed, spun in the drum, or a combination thereof.

Y. The process according to any of Paragraphs P to X, wherein after contacting said treatment liquor to said fabric article, said treatment liquor is drained from said drum and said fabric article is rinsed.

Z. The process according to any of Paragraphs P to Y, wherein said acidic treatment composition comprises from about 30% to about 50% by weight of said acidic treatment composition an organic acid.

AA. The process according to any of Paragraphs P to Z, wherein said tertiary treatment composition is said fabric softening composition.

BB. The process according to any of Paragraphs P to Z, wherein said tertiary treatment composition is said fabric softening composition, wherein said fabric softening composition comprises from about 1% to about 20% by weight of said fabric softening composition said perfume.

CC. The process according to any of Paragraphs P to BB, wherein said acidic treatment composition comprises from about 10% to 50% by weight of said acidic treatment composition an organic acid.

DD. The process according to any of Paragraphs P to CC, wherein said tertiary treatment composition is said scent additive, wherein said scent additive composition comprises from about 1% to about 30% by weight of said scent additive composition perfume.

EE. A process for treating a fabric article comprising steps of:

providing a fabric article within a rotatable drum within a washing machine;

conducting a first laundry treatment sub-cycle comprising steps of:

providing an acidic treatment composition to said washing machine, wherein said acidic treatment composition comprises:

from about 10% to 99% by weight of said acidic treatment composition organic acid;

providing within said drum a treatment liquor formed by combining said acidic treatment composition and a first water; and contacting said treatment liquor to said fabric article;

conducting a second laundry treatment sub-cycle comprising steps of:

providing a detergent composition to said washing machine, wherein said detergent composition comprises:

from about 10% to about 80% by weight of the detergent composition anionic surfactant; and from about 10% to about 80% by weight of the detergent composition nonionic surfactant;

providing within said drum a wash liquor formed by combining said detergent composition and a second water; and contacting said wash liquor to said fabric article;

conducting a third laundry treatment sub-cycle that comprising the steps of:

providing a tertiary treatment composition to said washing machine, wherein said tertiary treatment composition comprises:

from about 10% to 99% by weight of said tertiary treatment composition organic acid;

providing within said drum a tertiary treatment liquor formed by combining said tertiary treatment composition and a third water; and contacting said treatment liquor to said fabric article.

FF. The process according to Paragraph EE, wherein after contacting said treatment liquor to said fabric article and before conducting said second laundry treatment sub-cycle, at least a portion of said treatment liquor is drained from said drum.

GG. The process according to Paragraph EE or FF, wherein a first rinse water is applied to said fabric article before, while, or after said treatment liquor is drained from said drum.

HH. The process according to any of Paragraphs EE to GG, wherein before, while, or after said treatment liquor is drained from said drum, said fabric article is rinsed, spun in the drum, or a combination thereof.

II. The process according to any of Paragraphs EE to HH, wherein after contacting said wash liquor to said fabric article and before conducting said third laundry treatment sub-cycle, at least a portion of said wash liquor is drained from said drum.

JJ. The process according to Paragraph II, wherein a second rinse water is applied to said fabric article before, while, or after said wash liquor is drained from said drum.

KK. The process according to Paragraph II or JJ, wherein before, while, or after said wash liquor is drained from said drum, said fabric article is rinsed, spun in the drum, or a combination thereof.

LL. The process according to any of Paragraphs EE to KK, wherein a third rinse water is applied to said fabric article before, while, or after said tertiary liquor is drained from said drum.

MM. The process according to any of Paragraphs EE to LL, wherein before, while, or after said tertiary liquor is drained from said drum, said fabric article is rinsed, spun in the drum, or a combination thereof.

NN. The process according to any of Paragraphs EE to MM, wherein after contacting said tertiary treatment liquor to said fabric article, said tertiary treatment liquor is drained from said drum and said fabric article is rinsed.

OO. The process according to any of Paragraphs EE to NN, wherein said acidic treatment composition comprises from about 30% to about 50% by weight of said acidic treatment composition an organic acid.

PP. The process according to any of Paragraphs EE to OO, wherein said acidic treatment composition comprises from about 10% to 50% by weight of said acidic treatment composition an organic acid.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for treating a fabric article comprising steps of:

providing a fabric article within a rotatable drum within a washing machine;

conducting a first laundry treatment sub-cycle comprising steps of:

providing a detergent composition to said washing machine, wherein said detergent composition comprises:

from about 10% to about 80% by weight of the detergent composition anionic surfactant; and from about 10% to about 80% by weight of the detergent composition nonionic surfactant;

providing within said drum a wash liquor formed by combining said detergent composition and a first water; and contacting said wash liquor to said fabric article;

conducting a second laundry treatment sub-cycle comprising steps of:

providing an acidic treatment composition to said washing machine, wherein said acidic treatment composition comprises:

from about 10% to 99% by weight of said acidic treatment composition organic acid;

providing within said drum a treatment liquor formed by combining said acidic treatment composition and a second water; and contacting said treatment liquor to said fabric article;

conducting a third laundry treatment sub-cycle comprising the steps of:

providing a tertiary treatment composition to said washing machine, wherein said tertiary treatment composition is selected from the group of: a fabric softening composition comprising from about 2% to about 20% by weight of said fabric softening composition a fabric softening active; a scent additive composition comprising from about 1% to about 100% by weight of said scent additive composition a perfume; a fabric softening composition comprising a perfume and from about 2% to about 20% by weight of the fabric softening composition a fabric softening active; and an emulsion comprising an aminoalkyl containing polyorganosiloxane or silicone resin;

providing within said drum a tertiary liquor formed by combining said tertiary treatment composition and a third water; and contacting said tertiary liquor to said fabric article and thereafter draining said tertiary liquor or a water dilution thereof from said drum and rinsing said fabric article.

2. The process according to claim 1, wherein after contacting said wash liquor to said fabric article and before conducting said second laundry treatment sub-cycle, at least a portion of said wash liquor is drained from said drum.

3. The process according to claim 2, wherein a first rinse water is applied to said fabric article before, while, or after said wash liquor is drained from said drum.

4. The process according to claim 2, wherein before, while, or after said wash liquor is drained from said drum, said fabric article is rinsed, spun in the drum, or a combination thereof.

5. The process according to claim 1, wherein after contacting said treatment liquor to said fabric article and before conducting said third laundry treatment sub-cycle, at least a portion of said treatment liquor is drained from said drum.

6. The process according to claim 5, wherein a second rinse water is applied to said fabric article before, while, or after said treatment liquor is drained from said drum.

7. The process according to claim 5, wherein before, while, or after said treatment liquor is drained from said drum, said fabric article is rinsed, spun in the drum, or a combination thereof.

8. The process according to claim 1, wherein after contacting said tertiary liquor to said fabric article, at least a portion of said tertiary liquor is drained from said drum.

9. The process according to claim 8, wherein a third rinse water is applied to said fabric article before, while, or after said tertiary liquor is drained from said drum.

10. The process according to claim 1, wherein before, while, or after said tertiary liquor is drained from said drum, said fabric article is rinsed, spun in the drum, or a combination thereof.

11. The process according to claim 1, wherein after contacting said treatment liquor to said fabric article, said treatment liquor is drained from said drum and said fabric article is rinsed.

12. The process according to claim 1, wherein said acidic treatment composition comprises from about 30% to about 50% by weight of said acidic treatment composition an organic acid.

13. The process according to claim 1, wherein said tertiary treatment composition is said fabric softening composition.

14. The process according to claim 1, wherein said tertiary treatment composition is said fabric softening composition, wherein said fabric softening composition comprises from about 1% to about 20% by weight of said fabric softening composition said perfume.

15. The process according to claim 1, wherein said acidic treatment composition comprises from about 10% to 50% by weight of said acidic treatment composition an organic acid.

16. The process according to claim 1, wherein said tertiary treatment composition is said scent additive, wherein said scent additive composition comprises from about 1% to about 30% by weight of said scent additive composition perfume.

* * * * *